United States Patent
Kirsanov

(10) Patent No.: US 11,886,687 B1
(45) Date of Patent: Jan. 30, 2024

(54) EFFICIENT ROUTE SELECTION FOR CLIENT-INITIATED SEGMENTS

(71) Applicant: JetSmarter Inc., Fort Lauderdale, FL (US)

(72) Inventor: Mikhail Kirsanov, Fort Lauderdale, FL (US)

(73) Assignee: JetSmarter Inc., Fort Lauderdale, FL (US)

( * ) Notice: Subject to any disclaimer, the term of this patent is extended or adjusted under 35 U.S.C. 154(b) by 0 days.

(21) Appl. No.: 17/482,744

(22) Filed: Sep. 23, 2021

Related U.S. Application Data

(60) Provisional application No. 63/082,173, filed on Sep. 23, 2020.

(51) Int. Cl.
*G06F 16/248* (2019.01)
*G06F 3/0482* (2013.01)
*G06F 16/242* (2019.01)
*G06F 16/2457* (2019.01)
*G06F 16/2458* (2019.01)

(52) U.S. Cl.
CPC .......... *G06F 3/0482* (2013.01); *G06F 16/242* (2019.01); *G06F 16/248* (2019.01); *G06F 16/2457* (2019.01); *G06F 16/2458* (2019.01); *G06F 16/24575* (2019.01)

(58) Field of Classification Search
CPC .. G06F 3/0482; G06F 16/242; G06F 16/2457; G06F 16/24575; G06F 16/2458; G06F 16/248
See application file for complete search history.

(56) References Cited

U.S. PATENT DOCUMENTS

| | | | |
|---|---|---|---|
| 7,565,157 B1 * | 7/2009 | Ortega | H04W 4/18 455/414.3 |
| 8,515,954 B2 * | 8/2013 | Gibbs | G06F 16/3322 707/758 |
| 8,601,019 B1 * | 12/2013 | Weininger | G06F 16/90324 707/769 |

(Continued)

OTHER PUBLICATIONS

The Info Pond, "How to book a flight on Expedia.com" published on May 10, 2016 on YouTube, available at https://www.youtube.com/watch?v=t6qvLhZ_zc4 , duration 6:59. (Year: 2016).*

(Continued)

*Primary Examiner* — Dino Kujundzic
(74) *Attorney, Agent, or Firm* — Fish & Richardson P.C.

(57) ABSTRACT

This document describes techniques and user interfaces that enable efficient selection of routes for private segments. In one aspect, a method includes receiving data indicating one or more textual characters entered into a text entry field of a user interface presented by a computing device. In response to receiving the data indicating the one or more textual characters, a selection if made of one or more airport groups based at least in part on the one or more textual characters entered into the text entry field of the user interface. Each airport group includes a respective subset of a set of airports selected for the airport group based at least in part on historical data for previous client-initiated segments to and from airports in the set of airports. The user interface is updated to present data identifying each of the one or more selected airport groups.

23 Claims, 9 Drawing Sheets

(56) References Cited

U.S. PATENT DOCUMENTS

| | | | | |
|---|---|---|---|---|
| 8,856,115 B1* | 10/2014 | Huffman | | G06F 16/9038 |
| | | | | 707/724 |
| 8,930,391 B2* | 1/2015 | Chakrabarti | | G06F 16/951 |
| | | | | 707/765 |
| 9,690,858 B1* | 6/2017 | Diliberto | | G06F 16/3322 |
| 10,187,747 B1* | 1/2019 | Zhang | | H04W 4/022 |
| 2004/0254928 A1* | 12/2004 | Vronay | | G06F 16/243 |
| | | | | 707/999.005 |
| 2008/0065617 A1* | 3/2008 | Burke | | G06F 16/951 |
| | | | | 707/999.005 |
| 2010/0010978 A1* | 1/2010 | Carapella | | G06F 16/2425 |
| | | | | 707/E17.014 |
| 2011/0173217 A1* | 7/2011 | Kasperski | | G06F 16/3322 |
| | | | | 707/767 |
| 2011/0258049 A1* | 10/2011 | Ramer | | G06Q 30/0273 |
| | | | | 705/14.69 |
| 2012/0016678 A1* | 1/2012 | Gruber | | G06F 40/279 |
| | | | | 704/E21.001 |
| 2012/0166182 A1* | 6/2012 | Ko | | G06F 40/58 |
| | | | | 707/727 |
| 2013/0024461 A1* | 1/2013 | Lee | | G06F 16/90324 |
| | | | | 707/E17.066 |
| 2013/0325839 A1* | 12/2013 | Goddard | | G06F 16/9535 |
| | | | | 707/708 |
| 2014/0108070 A1* | 4/2014 | Vernitsky | | G06Q 10/025 |
| | | | | 705/6 |
| 2014/0180732 A1* | 6/2014 | Rotchin | | G06Q 10/083 |
| | | | | 705/5 |
| 2014/0181100 A1* | 6/2014 | Ramer | | G06F 16/90324 |
| | | | | 707/728 |
| 2014/0280000 A1* | 9/2014 | Subramanian Karthik | | |
| | | | | G06F 16/90324 |
| | | | | 707/706 |
| 2015/0006505 A1* | 1/2015 | Plakhov | | G06F 16/3328 |
| | | | | 707/710 |
| 2015/0169662 A1* | 6/2015 | Hills | | G06F 16/285 |
| | | | | 707/769 |
| 2016/0092598 A1* | 3/2016 | Mishra | | G06F 16/90328 |
| | | | | 707/740 |
| 2017/0124489 A1* | 5/2017 | Leavitt | | G06Q 10/02 |
| 2018/0130149 A1* | 5/2018 | Cheng | | G06F 16/9535 |
| 2018/0157669 A1* | 6/2018 | Naghdy | | G06Q 30/02 |
| 2018/0349472 A1* | 12/2018 | Kohlschuetter | | G06F 16/35 |

OTHER PUBLICATIONS

Danyang Jiang et al., "Location-sensitive Personalized Query Auto-Completion," 2018, 10th International Conference on Intelligent Human-Machine Systems and Cybernetics, IEEE, pp. 15-19. (Year: 2018).*

Xiaoqian Sun, et al., "Multiple airport regions based on inter-airport temporal distances," May 2017, Transportation Research Part E: Logistics and Transportation Review, vol. 101, pp. 84-98. (Year: 2017).*

* cited by examiner

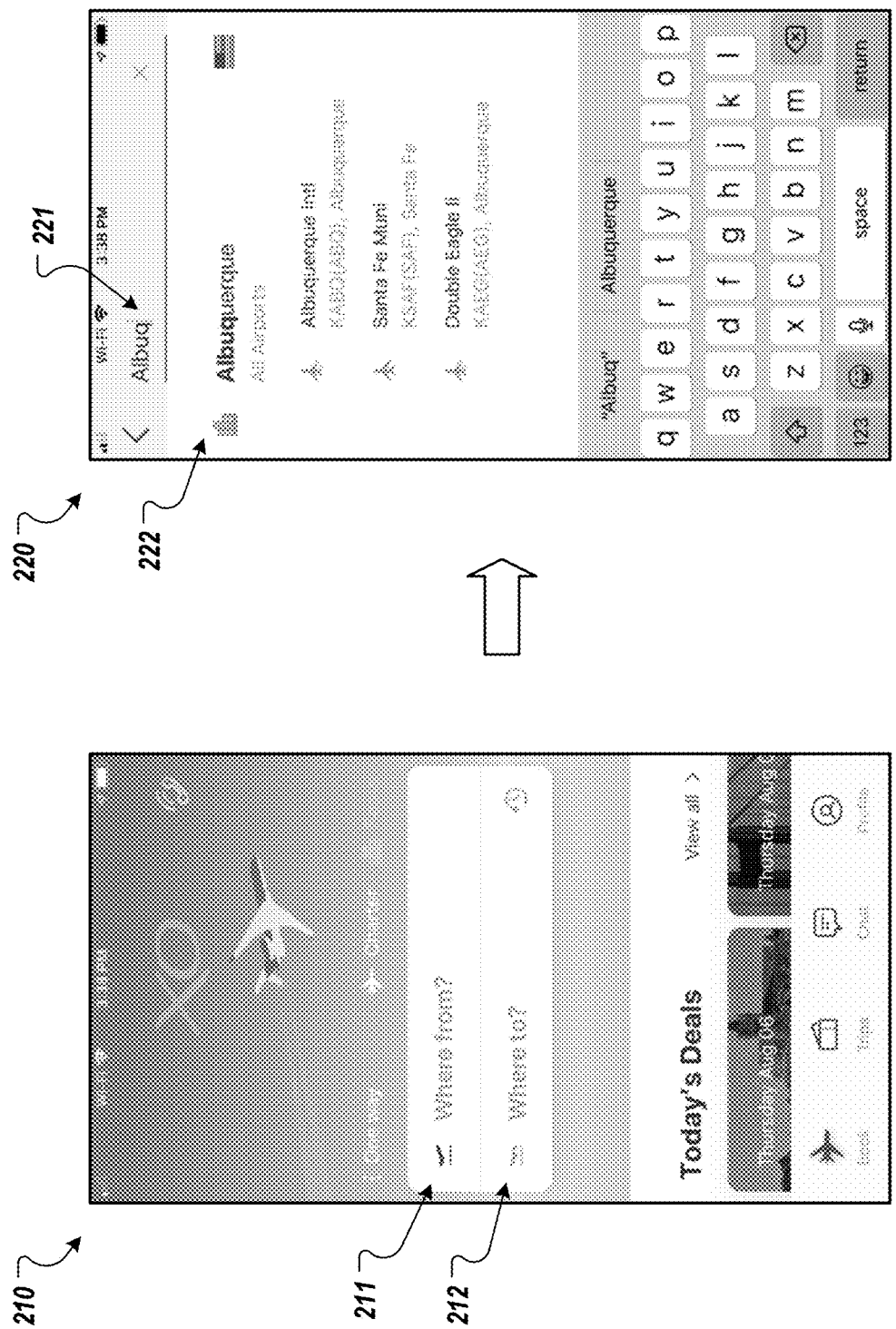

EFFICIENT ROUTE SELECTION FOR CLIENT-INITIATED SEGMENTS

CROSS REFERENCE TO RELATED APPLICATION

This application claims the benefit under 35 U.S.C. § 119(e) of U.S. Application Ser. No. 63/082,173, titled "EFFICIENT ROUTE SELECTION FOR CLIENT-INITIATED SEGMENTS," filed Sep. 23, 2020, the entire contents of which are incorporated herein by reference.

BACKGROUND

This specification relates to data processing and more efficiently selecting routes for client-initiated segments.

Historically, options for traveling between an origin and a destination have been limited to commercial public options in which individual spots (e.g., seats) are acquired by anyone and private options in which all spots in an aircraft or other mode of transport are acquired together by an individual. In both approaches, the user reserving such flights had very limited options, such as selecting an available seat on an existing flight or reserving a charter between two cities.

SUMMARY

In general, one innovative aspect of the subject matter described in this specification can be embodied in methods that include receiving data indicating one or more textual characters entered into a text entry field of a user interface presented by a computing device; and in response to receiving the data indicating the one or more textual characters: selecting, from among multiple airport groups, one or more airport groups based at least in part on the one or more textual characters entered into the text entry field of the user interface, wherein each airport group includes a respective subset of a set of airports selected for the airport group based at least in part on historical data for previous client-initiated segments to and from airports in the set of airports; and updating the user interface to present data identifying each of the one or more selected airport groups. Other implementations of this aspect include corresponding apparatus, systems, and computer programs, configured to perform the aspects of the methods, encoded on computer storage devices.

These and other embodiments can each optionally include one or more of the following features. In some aspects, the historical data for previous client-initiated segments includes data specifying, for each of multiple geographic locations, a number of times clients selected each airport after searching for segments to or from the geographic location. Updating the user interface to present data identifying each of the one or more selected airport groups can include updating the user interface to present, for each of the one or more selected airport groups, the subset of airports selected for the selected airport group in order based on a quantity of previous client-initiated segments to and from the airports.

In some aspects, the historical data includes data indicating (i) a measure of demand for client-initiated segments to and from each of the set of airports, (ii) a total number of client-initiated segments to and from each of the set of airports created in a given time period, (iii) a total number of client-initiated segments to and from each of the set of airports scheduled for a given time period, (iv) a total number of client-initiated searches for each of the set of airports created in a given time period, (v) a frequency at which client-initiated segments to and from each of the set of airports have historically been created, (vi) a frequency at which client-initiated segments to and from each of the set of airports have historically occurred, (vii) a frequency at which client-initiated searches for each of the set of airports have historically occurred, or (viii) a combination thereof.

Some aspects include determining a ranking of each of the one or more selected airport groups based at least in part on one or more portions of the historical data, the one or more portions of the historical data including historical data for previous client-initiated segments to and from each airport included in the one or more selected airport groups. Updating the user interface to present data identifying each of the one or more selected airport groups can include updating the user interface to present data identifying each of the one or more selected airport groups in order by ranking.

Some aspects include generating, for each of the one or more selected airport groups based at least in part on the one or more textual characters entered into the text entry field of the user interface, a score reflecting a level of confidence that the one or more textual characters entered into the text entry field of the user interface correspond to the respective airport group. Generating the score for each of the one or more selected airport groups based at least in part on the one or more textual characters entered into the text entry field of the user interface can include generating, for each of the one or more selected airport groups based at least in part on (i) the one or more textual characters entered into the text entry field of the user interface and (ii) one or more portions of the historical data including historical data for previous client-initiated segments to and from the subset of airports in the respective airport group, the score reflecting a level of confidence that the one or more textual characters entered into the text entry field of the user interface correspond to the respective airport group. Some aspects can include determining a ranking of each of the one or more selected airport groups based at least in part on the score generated for each of the one or more selected airport groups. Updating the user interface to present data identifying each of the one or more selected airport groups can include updating the user interface to present data identifying each of the one or more selected airport groups in order by ranking.

Some aspects include determining that the score generated for a particular airport group included in the one or more selected airport groups exceeds one or more threshold values and in response to determining that the score generated for the particular airport group exceeds one or more threshold values, updating the user interface to present data identifying the particular airport group and data identifying the subset of airports in the particular airport group. Some aspects can include generating, for each airport that is included in the particular airport group based at least in part on the one or more textual characters entered into the text entry field of the user interface, a score reflecting a level of confidence that the one or more textual characters entered into the text entry field of the user interface correspond to the respective airport.

Some aspects can include determining a ranking of the subset of airports in the particular airport group based at least in part on the scores generated for the airports that are included in the particular airport group. Updating the user interface to present data identifying the particular airport group and data identifying the subset of airports in the particular airport group can include updating the user interface to present data identifying the particular airport group and data identifying the subset of airports in the particular airport group in order by ranking.

Some aspects can include generating, for each airport that is included in the one or more selected airport groups based at least in part on the one or more textual characters entered into the text entry field of the user interface, a score reflecting a level of confidence that the one or more textual characters entered into the text entry field of the user interface correspond to the respective airport. Generating the score for each of the one or more selected airport groups based at least in part on the one or more textual characters entered into the text entry field of the user interface can include generating, for each of the one or more selected airport groups based at least in part on the scores generated for the airports that are included in the respective airport group, a score reflecting a level of confidence that the one or more textual characters entered into the text entry field of the user interface correspond to the respective airport group.

In some aspects, generating the score for each of the one or more selected airport groups based at least in part on the one or more textual characters entered into the text entry field of the user interface can include generating, for each of multiple airport groups based at least in part on the one or more textual characters entered into the text entry field of the user interface, a score reflecting a level of confidence that the one or more textual characters entered into the text entry field of the user interface correspond to the respective airport group. Selecting, from among the airport groups, one or more airport groups based at least in part on the one or more textual characters entered into the text entry field of the user interface can include selecting, from among the plurality of airport groups, one or more airport groups based at least in part on the scores generated for the airport groups.

In some aspects, each subset of the set of airports selected for each airport group includes two or more airports identified, from among the set of airports, as being located in a same respective geographic region. The two or more airports that are included in each airport group can be identified as being located in the same respective geographic region based on one or more portions of the historical data. The two or more airports that are included in each airport group and identified as being located in the same respective geographic region can include two or more airports identified, from among the set of airports, as being located in a same respective metropolitan area.

In some aspects, a portion of the individual airports belong to none of the plurality of groups of airports. In some aspects, the user interface can include (i) a first text entry field for receiving text specifying a departure location from which a new client-initiated segment will depart, and (ii) a second text entry field for receiving text specifying a destination location at which the new client-initiated segment will arrive. Receiving data indicating one or more textual characters entered into the text entry field of the user interface presented by the computing device can include receiving data indicating one or more textual characters entered into the first text entry field or the second text entry field of the user interface presented by the computing device. Some aspects can include, before receiving the data indicating the one or more textual characters entered into the text entry field of the user interface presented by the computing device, receiving data indicating a selection of the first text entry field and, in response to receiving data indicating the selection of the first text entry field, selecting, from among the plurality of airport groups, an initial set of one or more airport groups based at least in part on a current location of the computing device and updating the user interface to present data identifying each of the initial set of one or more selected airport groups. Some aspects can include, before receiving the data indicating the one or more textual characters from the computing device, receiving data indicating a selection of the second text entry field and, in response to receiving data indicating the selection of the second text entry field, selecting, from among the plurality of airport groups, an initial set of one or more airport groups based at least in part on a departure location currently specified in the first text entry field and updating the user interface to present data identifying each of the initial set of one or more selected airport groups.

In some aspects, receiving data indicating one or more textual characters entered into the text entry field of the user interface presented by the computing device can include receiving data indicating one or more textual characters entered into the first text entry field user interface presented by the computing device. Updating the user interface to present data identifying each of the one or more selected airport groups can include updating the user interface to present data identifying each of the one or more selected airport groups as one or more suggested departure locations, respectively.

In some aspects, receiving data indicating one or more textual characters entered into the text entry field of the user interface presented by the computing device can include receiving data indicating one or more textual characters entered into the second text entry field user interface presented by the computing device. Updating the user interface to present data identifying each of the one or more selected airport groups can include updating the user interface to present data identifying each of the one or more selected airport groups as one or more suggested destination locations, respectively.

Some aspects include, after updating the user interface to present data identifying each of the one or more selected airport groups, receiving data indicating a selection of a particular airport group included in the one or more selected airport groups and, based on receiving data indicating the selection of the particular airport group, updating the user interface to present information associated with one or more segments from a departure location specified in the first text entry field to one or more of the airports included in the particular airport group.

In some aspects, selecting, from among the airport groups, one or more airport groups based at least in part on the one or more textual characters entered into the text entry field of the user interface includes selecting, from among the airport groups and the set of airports, one or more airport groups and one or more airports based at least in part on the one or more textual characters entered into the text entry field of the user interface. Updating the user interface to present data identifying each of the one or more selected airport groups can include updating the user interface to present data identifying each of the one or more selected airport groups and each of the one or more selected airports.

In some aspects, none of the one or more selected airports are included in the one or more selected airport groups. Some aspects include determining a ranking of each of the one or more selected airport groups and each of the one or more selected airports based at least in part on one or more portions of the historical data, the one or more portions of the historical data including historical data for previous client-initiated segments to and from each airport included in the one or more selected airport groups and the one or more selected airports. Updating the user interface to present data identifying each of the one or more selected airport groups and each of the one or more selected airports can include updating the user interface to present data identifying each of the one or more selected airport groups and each of the one or more selected airports in order by ranking.

In some aspects, each of one or more of the set of airports belongs to two or more of the airport groups. In some aspects, the two or more of the airport groups to which each of one or more of the set of airports belongs include a first group of airports identified as being located in a first geographic region and a second group of airports identified as being located in a second geographic region encompassed by the first geographic region.

In some aspects, updating the user interface to present data identifying each of the one or more selected airport groups includes updating the user interface to present, for each of the one or more selected airport groups, a textual identifier that is associated with the respective airport group and contains the one or more textual characters. In some aspects, the textual identifier represents an auto-completion of the one or more textual characters. In some aspects, each of one or more of the set of airports is associated with two or more textual identifiers.

Particular embodiments of the subject matter described in this specification can be implemented so as to realize one or more of the following advantages. User interfaces that enable clients to view multiple candidate airports and their relative required amounts (e.g., costs) on a single display, and enables the clients to select the airports for a new private jet segment, provides such information in a more efficient way, e.g., rather than requiring the client to go through the configuration process for each candidate airport to view its required amount. As such, the user interfaces described herein directly provide clients information about multiple candidate airports in both the departure and destination location without requiring the clients to navigate to multiple different user interface screens in order to obtain the information. This saves the client time, reduces the computational burden placed on the client device to generate and present many user interfaces, reduces the amount of data sent over a network between the client device and a server that provides the information for various flight options, and reduces the computational burden placed on the server to respond to the multiple requests for data. As such, the user interfaces discussed herein provide a more efficient workflow and presentation of information to the clients.

The user interfaces described herein also enable the client greater flexibility in finding an airport in particular cities, some with which the client may not be familiar. As private jets often depart from and arrive at smaller airports, the user interfaces provide information about airports of which clients are typically not aware. In addition, these smaller airports typically require lower amounts for use by private jet operators than large, commercial airports. By providing user interfaces that group airports within geographic regions and presenting each client with data identifying one or more such airport groups as departure and/or destination suggestions as the client provides textual input specifying departure and/or destination locations for a new client-initiated private jet segments (e.g., new private jet charter), such clients may be able to quickly and easily discover and select suitable departure and destination airports for their private jet segments. And, by leveraging historical data for previous client-initiated private jet segments in one or more processes associated with the grouping, selection, and/or presentation of data identifying airports and/or airport groups, clients may often find such departure and/or destination suggestions to be of relevance to their private jet segments. A sequence of user interfaces described in this document can guide a client through the selection of departure and destination locations for a new private jet segment, making the selection of the locations more efficient for the client and the client device, thereby conserving battery of mobile devices, reducing the computational burden on the client device, and reducing the consumption of network bandwidth to request and provide the data required to make such selections. Aggregated over many, e.g., thousands or millions of client devices, the network bandwidth and computational savings are substantial.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 2A-6C are illustrations of example interactive graphical interfaces for creating a new private jet segment.

Like reference numbers and designations in the various drawings indicate like elements.

DETAILED DESCRIPTION

This document describes methods, systems, devices, and computer readable media that facilitate creation of client-initiated segments, including client-initiated private jet charter segments. As used throughout this document, a segment refers to a flight between an origin and a destination. The term segment refers to any type of flight that carries clients, including shuttles (e.g., a flight between a set of locations specified by the service provider) and charters (e.g., a flight between two locations freely specified by a client).

As described in detail below, the segment can be initiated by a client (e.g., a member of a service and/or a user of an application that facilitates creation of the segment), and made available to other clients, for example, by way of a native mobile application (or another appropriate interactive environment, such as a web interface). The aircraft used to travel between the origin and destination is typically a non-commercial aircraft (e.g., a private jet). While any appropriate type of aircraft (e.g., a propeller aircraft, a jet aircraft, or a rotorcraft) can be used, they will be collectively referred to using the term "jet" for brevity. A spot refers to seat or other appropriate area of occupancy for a client on a jet that is used for the segment.

As described in more detail below, the efficient creation of client-initiated segments involves a real-time interaction between the client that is initiating the segment and the automated computing system that is facilitating the creation of the client-initiated segment, which is also simply referred to herein as a segment for brevity. One aspect of this is providing user interfaces that enable the clients to configure the various customizable attributes for the segments, such as a departure airport, a destination airport, a departure date (which can include a date and/or time), at which the segment will depart from the departure airport, a type of jet (e.g., light, midsize, heavy, propeller, rotorcraft, etc.), a number of spots the client wants to claim on a shared segment (e.g., a shared charter segment in which at least one seat is made available to other clients), and/or other appropriate attributes. The user interfaces are configured to make this process more efficient by guiding the user through the various candidate attributes (e.g., departure and destination locations) and providing the relevant information for each attribute in an efficient manner so that the client can quickly create or search of segments without having to submit separate different requests for information or navigating to multiple different user interface displays to find such information for different attributes.

Figure 1:
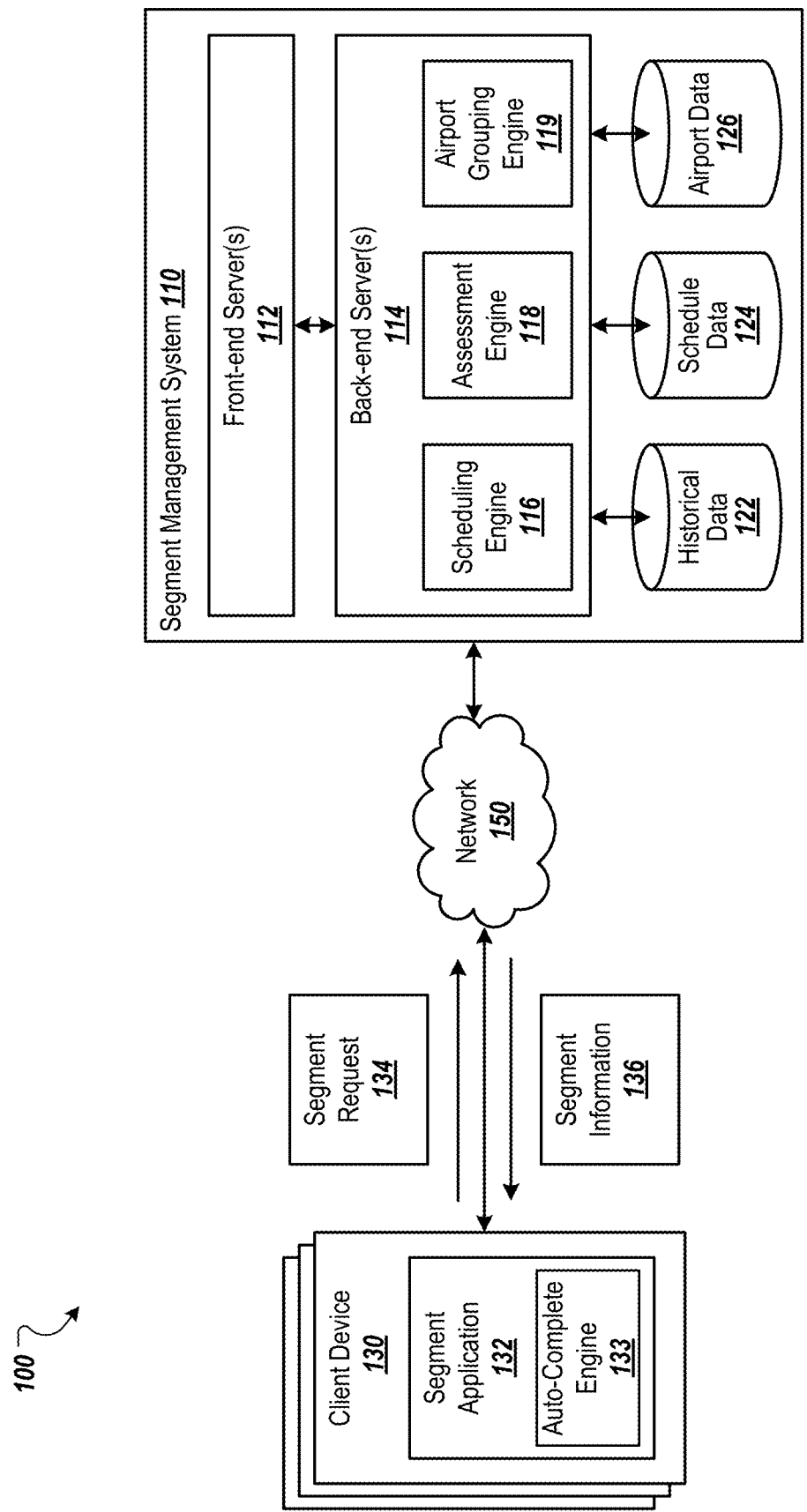
FIG. 1 is a block diagram of an example environment in which a segment management system enables clients to create private jet segments.

FIG. 1 is a block diagram of an example environment 100 in which a segment management system 110 enables clients to initiate segments, including shared charter segments and non-shared (or private) charter segments. A shared charter segment is a charter segment for which the client that created the charter segment is making one or more spots on the charter segment available to other clients (e.g., for purchase) through a platform managed by the segment management system 110. A non-shared charter segment is a charter segment for which the client does not make any spots available for other clients.

The example environment 100 includes a network 150, such as a local area network (LAN), a wide area network (WAN), the Internet, a mobile network, or a combination thereof. The network 150 connects client devices 130 of clients with the segment management system 110. The example environment 100 can include many different client devices 130.

The segment management system 110, which can be operated and maintained by a segment service provider, allows users to arrange transportation on segments provided by the segment service provider. The segment service provider can provide scheduled segments between origins and destinations. The segment service provider can also allow clients (e.g., members of the segment service provided by the segment service provider) to initiate segments with custom attributes (e.g., custom departure date, origin and/or departure airport, destination and/or destination airport, time of day of departure, and/or type of jet). For example, a client may want to travel from an origin to a destination on a day in which the scheduled segment(s) from the origin to the destination are full or on a day that no segments are scheduled from the origin to the destination. In this example, the client can initiate a segment from the origin to the destination on the day and/or time that the client wants to travel. A client that initiates a segment is also referred to as a creator.

A client can initiate and manage segments, claim a spot on a segment, manage other travel arrangements with the segment management system 110, and/or perform other appropriate tasks related to the segment management system 110 using a client-side application 132 executed on the client's client device 130. The application 132 can transmit data to, and receive data from, the segment management system 110 over the network 150. The application 132 can be implemented as a native application developed for a particular platform or a particular device, web browser that provides a web interface, or another appropriate type of application.

The application 132 can present and detect user interactions with various graphical user interfaces that allow the client to create segments (e.g., create a new custom charter segment), manage segments (e.g., make a charter shared and make spots available to other clients), and/or claim a spot on shared segments. Some example interfaces generated and presented by the application 132 are illustrated in FIGS. 2A-6C and described in detail below.

The segment management system 110 includes one or more front-end servers 112 and one or more back-end servers 114. The front-end servers 112 can transmit data to, and receive data from, client devices 130 over the network 150. For example, the front-end servers 112 can provide, to the application 132 of a client's client device 130, interfaces or data for presentation with the interfaces. The front-end servers 112 can also receive data specifying user interactions with the interfaces of the application 130, such as attributes of a conditional segment initiated by the client. As described in more detail below, the front-end servers 112 can update the interfaces, provide new interfaces, and/or update the data presented by the interfaces based on user interactions with the application 132.

The front-end servers 112 can also communicate with the back-end servers 114. For example, the front-end servers 112 can identify data that is to be processed by the back-end servers 114, e.g., data specifying attributes of a conditional segment, and provide the identified data to the back-end servers 114. The front-end servers 112 can also receive, from the back-end servers 114, data for a particular client and transmit the data to the client device 130 of the particular client over the network 150.

The back-end servers 114 include a segment scheduling engine 116 and a spot assessment engine 118. The segment scheduling engine 116 manages the creation, confirmation, and/or cancellation of segments including charter segments. The segment scheduling engine 116 can receive data specifying attributes of a segment initiated by a client and create the segment within the segment management system 110. For example, a client that uses a client device 130 can interact with the application 132 to initiate a segment and specify attributes of the segment. The attributes can include a departure geographic identifier (e.g., an origin city and/or airport identifier, e.g., airport code), a destination geographic identifier (e.g., a destination city and/or airport identifier, e.g., airport code), a departure date (which can include a date and/or time) at which the segment will depart from the origin, a type of jet (e.g., light, midsize, heavy, propeller, rotorcraft, etc.), a number of spots the client wants to claim on the segment (e.g., if the segment is a shard charter segment), and/or other appropriate attributes. As used herein, the term engine refers to a data processing apparatus that performs a set of tasks.

The application 132 can generate a segment request 134 and cause the client device 130 to transmit the segment request 134 to the segment management system 110 over the network 150. The segment request 134 can include one or more of the client-specified attributes. In some implementations, the segment request 134 can include all of the attributes. For example, the application 132 can cause the client device 130 to transmit the segment request 134 after all of the appropriate attributes have been obtained from the client. As described in more detail below, the application 132 can prompt the client for the attributes using multiple interfaces.

In some implementations, the segment request 134 includes only a portion of the attributes (e.g., less than all of the attributes required by the segment service provider). For example, the segment scheduling engine 116 can cause the application 132 to prompt the client for additional attributes or other information based on initial attributes received in the conditional segment request 134. In a particular example, the segment request 134 can include the departure geographic identifier and destination geographic identifier.

The segment scheduling engine 116 can receive these attributes and obtain information for potential segments along the route from the departure location identified by the departure geographic identifier to the destination location identified by the destination geographic identifier. The segment scheduling engine 116 can then provide, to the client device 110, segment information 136 that includes the obtained information.

This segment information 136 can include airports for the departure and destination locations. For example, the segment information 136 can include data identifying a set of one or more departure airports in or near the departure location and a set of one or more destination airports in or near the destination location.

The segment information 136 can also include, for each of one or more potential dates for the segment, the types of jets available on the date, a required amount (or range of amounts) for each available type of j et on the date, a required amount for each airport for the date, the required amount for one or more departure time ranges on the date (e.g., departing early or late in the day can be more expensive than mid-day), and/or required amounts for other customizable attributes. As described in more detail below, an assessment engine 118 can determine the required amounts that are provided.

Advantageously, the segment scheduling engine 116 can obtain information for multiple airports and multiple dates (e.g., for each day of multiple weeks or multiple months) and provide the information in response to the one request, e.g., in one data transmission or a sequence of transmissions within a short time period such as one or two seconds. The segment application 132 can cache the segment information 136 at the client device 110 so that the segment application 132 can more efficiently and more quickly update the user interfaces based on the user's selections without having to transmit subsequent requests over the network 150. This improves the user experience, reduces latency, prevents application errors that may occur while waiting to receive data, reduces consumed network bandwidth that would be used by the multiple requests, and reduces the computation burden that would be placed on the segment management system 110 to receive and respond to the requests.

The segment application 132 can receive the segment information 136 and present the information to the client using one or more user interfaces. In a particular example, as described below with reference to FIGS. 2A-6C, the segment application 132 can present a sequence of user interfaces that enable the client to select departure and destination locations for the segment. The client can use the user interfaces to select attributes for the segment and finalize the segment, e.g., by selecting a confirmation user interface element or purchasing the segment. In response, the segment application 132 can provide the attributes to the segment scheduling engine 116, e.g., via a second segment request.

The segment scheduling engine 116 can receive the data and create the appropriate segment within the segment management system 110 based on the data and the attributes received from the client device 130. The segment scheduling engine 116 can also store the data for the created segment in a historical data storage unit 122 and/or schedule data storage unit 124. The schedule data storage unit 124 can include one or more databases (or other appropriate data storage structures) stored in one or more non-transitory data storage media (e.g., hard drive(s), flash memory, etc.).

The segment data storage unit 124 can store data for each segment that is provided by the segment service provider.

For example, the segment data storage unit 124 can store data for each client-initiated segment. The data for each segment can include the departure geographic identifier for the segment, the destination geographic identifier for the segment, the departure date for the segment, the type of jet and/or an identifier of the actual jet being used for the segment, an identifier for each client that has claimed a spot on the segment (e.g., if the segment is a shared charter segment), and/or other appropriate segment data. The data for each segment can also include data specifying whether the segment is a shared or non-shared charter segment.

The historical data storage unit 122 can store historical data for previous client-initiated segments created by clients. Such historical data can include data for each previous client-initiated segment (e.g., client-initiated segments having departure dates and/or arrival dates that are in the past) including one or more of the pieces of information described above as being stored in data storage unit 124. In some implementations, the functionality of both of data storage units 122 and 124 can be provided by way of a single data storage unit.

The historical data storage unit 122 can also store aggregated statistics for each private jet route. Each route can include a departure airport identifier for a departure airport and a destination airport identifier for a destination airport. The aggregated statistics for each route can include a total number of private jet segments that have been completed along the route and/or totals for each of multiple time periods. This data can be used to determine a level of private demand for the route, e.g., to compare the demand of routes amongst each other. This data can include segments completed by the segment service provider and optionally other private jet service providers, e.g., all private jet service providers for which information is available.

The historical data storage unit 122 can also store aggregated data for each airport. The data for each airport can include the total number of private jet flights to and from the airport and/or totals for each of multiple time periods. This data can be used to determine a level of private jet demand for the airport, e.g., to compare the demand of airports amongst each other.

The segment scheduling engine 116 can notify other clients of the created segment, e.g., if the segment is a shared charter segment. In some implementations, clients can view the available spots on various segments from an origin to a destination. For example, the application 132 can present the required amounts for spots on segments from an origin to a destination using a calendar interface. A client, e.g., the client associated with (e.g., logged into the application 132 on) the client device 130, can request a spot on a shared charter segment using the application 132.

The segment management system 110 also includes an assessment engine 118. The assessment engine 118 can determine an amount that clients are required to submit to create a new client-initiated segment. The amount can be based on various factors, such as the type of j et, the departure and destination geographic identifiers, the departure date, the departure airport, the destination airport, the time of data of departure, the duration of time between the time the segment is initiated and the departure date, the type of segment (e.g., conditional or confirmed), and/or other appropriate factors.

The various options of each attribute can affect the overall required amount for a segment. For example, there may be multiple types of jets that can be used to travel along a particular route, including turbo-props, light, mid-size, super mid-size, and/or heavy. Each type can have a different required amount for a particular route that can be based on the amount to operate the type of jet on the route, the availability of the jet for that route (e.g., it may cost more to move a jet to the departure airport for the segment), and/or other appropriate factors.

Similarly, there are often multiple airports that can accommodate private jets in metropolitan areas. Each airport can require that a private jet operator provide some amount (e.g., a monetary fee) to depart from or land at the airport. These amounts can vary between the airports. For example, large commercial airports may require a much larger amount than small private airports used mostly by recreational pilots. The assessment engine 118 can maintain the required amounts for each airport in an airport data storage device 126.

The required amount for a segment can also vary based on the time of day of departure. For example, departures during business hours may have a smaller required amount than departures early morning or late at night.

When providing the segment information 136 to the segment application 132, the scheduling engine 116 can obtain the required amounts for the various options for each attribute and provide that data with the segment information 136. This enables the segment application 132 to present the relative amounts, e.g., the additional amount required for a premium option, in the user interfaces presented to the client when configuring a client-initiated segment. This also enables the segment application 132 to compute the overall required amount for the segment based on the attributes selected by the client.

As mentioned above, there are often multiple airports that can accommodate private jets in geographic regions, e.g., in metropolitan areas. Indeed, there are three to four times more private airports in the world than commercial airports. Given that there are so many private airports, and also that such airports are often small and publicized to a limited extent (especially as compared to large, commercial airports), many clients may not be aware of the full spectrum of airport options that a given metropolitan area has to offer. As such, in some examples, the segment application 132 may provide an interactive interface that groups airports within geographic regions, ranks airport groups and the airports included therein (e.g., on the basis of demand), and provides each client with data identifying one or more such airport groups as departure and/or destination suggestions as the client provides textual input to the interactive interface specifying departure and/or destination locations for a new segment. The suggestions that are presented by the segment application 132 may serve to simplify and streamline the segment creation process for many clients by enabling such clients to quickly and easily discover and select airports for their segment.

The areas with which airports are grouped can also be identified based on the private flight demand (e.g., charter flight demand) of the airports or areas. For instance, airports can be grouped in a manner so as to yield an airport group for each geographic region in a top subset of the most frequently visited geographic regions in the world. For example, the segment application 132 can enable clients to create segments to and from over 12,000 airports around the world, and at least some these airports may be grouped (e.g., based at least in part on data associated with previous segments to and from each of the 12,000 airports) in a manner so as to yield 400 airport groups corresponding to the top 400 most frequently visited geographic regions in the world. In this example, the 400 airport groups may represent 3,000 of the aforementioned 12,000 airports. As such, in this example, 9,000 of the aforementioned 12,000 airports may not be selected for any airport groups, but clients may still able to easily create segments to and from such remaining airports through use of the segment application 132. By providing clients with suggestions for some of the most popular departure and destination locations in the world, such suggestions are more likely to be relevant to client-initiated segments and helpful to clients. Examples of the aforementioned interactive user interface are described in further detail below with reference to FIGS. 2A-6, and additional information regarding various ways in which the airports may be grouped, ranked, and presented to clients is provided immediately below.

In some implementations, the segment management system 110 includes an airport grouping engine 119 that identifies, from among multiple airports at various locations around the world (e.g., as identified in a corpus or database of airports), multiple airport groups (e.g., groups of airports in a geographic region) based on data stored in one or more of data storage units 122-126. More specifically, in these implementations, the airport grouping engine 119 can identify two or more airports as being located in the same geographic region based at least in part on the geographic location of the airports and/or historical data stored in one or both of data storage units 122 and 124, and thus representing a distinct airport group. Each of one or more airport groups may, for instance, correspond to a respective metropolitan area.

In some examples, the airport grouping engine 119 can identify each of the two or more airports as being located in the same geographic region based on the location of the respective airport relative to one or more geographically-adjacent airports (e.g., nearest neighboring airports), a measure of demand for segments, e.g., private jet segments, to and from the respective airport, and a measure of demand for segments to and from each of the one or more geographically-adjacent airports.

In at least some of these examples, the segment management system 110 can determine a measure of demand for segments to and from each of the multiple airports at various locations around the world (e.g., as identified in a corpus or database of airports) based on data stored in one or more of data storage units 122-126, and store data indicating such determined measures in one or more of data storage units 122-126. As such, in some of these examples, the segment management system 110 can periodically (e.g., once every ten minutes) update the determined measures based on the latest segment data received and/or generated by the segment management system 110 and/or update the determined measures in response to determining that new segment data has been received or generated. In this way, as various clients communicate with the segment management system 110 over time, measures determined for various airports and/or the airport groups to which various airports are identified as belonging may also change over time. In some implementations, the segment management system 110 can periodically transmit, to client device 130, data indicating the most recent measures determined for various airports and/or the airport groups to which various airports were most recently identified as belonging, or can transmit such data to client device 130 in response to determining that one or more updates have been made to the determined measures and/or airport groups.

In some examples, the measure of demand for segments to and from each airport that is determined by the segment management system 110 corresponds to and/or is indicative of one or more of a total number of client-initiated segments to and from each airport created in a given time period, a total number of client-initiated segments to and from each airport scheduled for a given time period, a total number of client-initiated searches for each airport received by the segment management system 110 (or other user interactions with the application 132 with respect to the airport) in a given time period, a frequency at which client-initiated segments to and from each airport have historically been created, a frequency at which client-initiated segments to and from each airport have historically occurred, and/or a frequency at which client-initiated searches for each airport have historically occurred. In some implementations, the measure of demand for an airport is based on, e.g., directly proportional to, the number or frequency of private jet flights departing from and/or arriving at the airport. These private jet flights can include the private jet flights of the segment service provider and optionally other private jet service providers.

In some implementations, the segment management system 110 (e.g., airport grouping engine 119 of the segment management system 110) can leverage one or more clustering or cluster analysis techniques to identify each of the various airport groups. In such implementations, the segment management system 110 can leverage such one or more techniques to identify clusters of airports (e.g., as clusters or hot spots on a map) that are located relatively close to one another and are collectively and/or individually associated with measures of demand for segments that are relatively high in value. In some examples, the segment management system 110 can leverage one or more heat mapping techniques and/or hot spot mapping techniques to identify airport groups in a similar manner (e.g., identify hot spots on a map). In these examples, each location on a map at which an airport is located may be represented or modeled as a sort of heat source, where the intensity of the heat produced at the location of each airport corresponds to the measure of demand for segments to and from the respective airport. The segment management system 110, in these examples, can identify regions on the map in which the intensity exceeds one or more threshold values, and can identify airports that are located in such identified regions as belonging to or representing an airport group. Other configurations are possible.

In some implementations, each airport group identified by the segment management system 110 can correspond to a respective geographic region defined by a respective center location and one or more boundaries, and all airports that are located within the one or more boundaries of the geographic region are identified as belonging to the corresponding airport group. In at least some of these implementations, one or both of the center location and the one or more boundaries may be predefined. In some examples, the one or more boundaries may be defined by a radius. In some examples, the segment management system 110 can leverage additional data to identify each of the various airport groups including population data (e.g., census data, statistics regarding population density, etc.), information indicating locations of borders between properties (e.g., locations of borders between cities, counties, states, provinces, countries, territories, etc.), and the like. In some implementations, one or more attributes (e.g., location, geometry, size, etc.) of one or more of the multiple airport groups may be handcrafted or otherwise specified by an entity associated with the segment management system 110. In these implementations, such one or more attributes of such one or more of the multiple airport groups may be fixed or remain static until an entity associated with the segment management system 110 changes them. Other configurations are possible. In some implementations, the airport grouping engine 119 groups airports into groups based on historical data indicating user interactions with the segment application 132. For example, the segment application 132 can enables clients to search for private jet segments based on geographic location and enable the clients to select from multiple airports in each geographic region. The airport grouping engine 119 can determine, based on this data, the number of times clients select each airport for each geographic region and assign the airports into airport groups based on this data.

For example, a big city may include five airports within the metropolitan area and there is another airport outside that metropolitan area. If only location data is used, the other airport may not be grouped into the airport group for that metropolitan area. However, clients may regularly select the other airport when searching for private jet segments to or from the metropolitan area.

The airport grouping engine 119 can determine whether to include an airport in an airport group for a geographic region based on the number of times clients select the airport when creating client-initiated private jet segments to or from the geographic region and/or the number of times clients select existing private jet segments to or from the airport after searching for existing private jet segments to or from the geographic region.

For example, if the number of times exceeds a threshold, the airport may be assigned to the airport group. If a ratio between the number of times clients select the airport to the total number of previous segments to and from the geographic region satisfies a threshold, the airport may be assigned to the airport group. In another example, if the number of times clients select the airport is the same as, higher than, or within a threshold amount of other airports in the airport group or in the geographic region, the airport may be assigned to the airport group. In some examples, one or more of the aforementioned thresholds can be set or determined based on the distance between the location of the airport and the location of the geographic region (e.g., a location of the center of the geographic region, a location along a boundary of the geographic region, a location of an airport in the geographic region, etc.). For instance, in some of these examples, one or more of the aforementioned thresholds can be set or determined in a manner such that one or more of the aforementioned thresholds increase as the distance between the location of the airport and the location of geographic region/airport group increases.

As mentioned above, in some implementations, the segment management system 110 can transmit historical data for previous client-initiated segments to and from various airports (e.g., data indicating the current measures determined for various airports) and/or data identifying the current airport groups. In some examples, the data identifying the current airport groups can include data identifying each airport that is included in each airport group data indicating one or more identifiers that are associated with each airport group, and data indicating an order (e.g., ranking) in which the airports should be presented when the airport group is presented. Such one or more identifiers can be representative of the geographic region to which each airport group corresponds can be assigned to each airport group. As one example, as described in further detail below with reference to FIGS. 6A-6C, an airport group including airports that are located in and around the New York City metropolitan area may be associated with identifiers including "New York" and "NYC." In some examples, the airport group of the aforementioned example may also be associated with the identifier of "Manhattan." In other examples, only a subset of airports in the airport group of the aforementioned example may also be associated with the identifier of "Manhattan." That is, in such other examples, some airports can belong to more than one airport group.

As described in further detail below, in some examples, the segment application 132 can leverage one or more portions of such data to enable clients to more easily create new private jet segments. In particular, the segment application 132 can enable clients to more quickly and easily identify and select the most suitable departure and destination airports for their segments by providing clients with departure and destination suggestions on both the regional- and airport-level based at least on one or more portions of such data. As described below, a list of such suggestions can be presented (e.g., as a drop-down menu) to a client when the client interacts with a departure selection element (e.g., a text entry field for receiving text specifying a departure location from which a new client-initiated segment will depart) and/or destination selection element (e.g., a text entry field for receiving text specifying a destination location at which the new client-initiated segment will arrive) of an interactive graphical user interface. Suggestions can be provided as soon as the client taps, selects, or otherwise interacts with the departure selection element and/or the destination selection element, and can be refined or otherwise updated as the client provides additional input (e.g., enters one or more textual characters) to the departure selection element and/or the destination selection element. Examples of lists of such suggestions include airport selection list interfaces 222, 322B, 322C, 322E, 322F, 422A, 422B, 422C, 522A, 522B, 522C, 622A, 622B, and 622C, as described in further detail below with reference to FIGS. 2, 3B, 3C, and 3E-6C.

Such suggestions can include data that identifies each of one or more airport groups selected by the segment application 132 and/or one or more airports selected by the segment application 132. More specifically, the segment application 132 can select such one or more airport groups and/or one or more airports based on the interactions between the client and the interactive graphical user interface, input provided by the client to the interactive graphical user interface (e.g., one or more textual characters entered into a text entry field), one or more portions of the aforementioned data received from the segment management system 110 (e.g., historical data, data indicating current measures determined for various airports, data identifying current airport groups, etc.), other data specified by the client (e.g., segment attributes), and/or other data obtained by the segment application 132 (e.g., GPS coordinates or other data indicating a current location of the computing device of the client on which the segment application 132 operates). Additionally or alternatively, in some examples, the segment application 132 can rank each of one or more airport groups and/or each of one or more airports based on one or more of the aforementioned factors, and present suggestions based on the determined rankings. As an example, the segment application 132 may only select the top five ranking airport groups and/or airports to present as suggestions. As another example, the segment application 132 can present suggestions corresponding to the one or more selected airport groups and/or one or more selected airports in order according to the rankings (e.g., present suggestions corresponding to higher ranking airport groups and/or airports toward the top or beginning of the list of suggestions and present suggestions corresponding to lower ranking airport groups and/or airports toward the bottom or end of the list of suggestions). In some implementations, the ranking is performed by the segment management system 110 and provided to the application 132, e.g., for each airport group.

In some implementations, the segment application 132 can generate, for each of one or more airport groups and/or each of one or more airports, a score reflecting a level of confidence that one or more textual characters entered into a text entry field of the interactive graphical user interface correspond to the respective airport group or airport. For example, such a score can be generated by or in association with one or more of auto-complete engines, such as auto-complete engine 133 of segment application 132 as described below with reference to FIG. 2B. In some of these implementations, the segment application 132 determines rankings for one or more airport groups and/or one or more airports based at least in part on the generated scores. In at least some such implementations, the segment application 132 can generate such scores based on historical data for previous client-initiated segments, as described above. Other configurations are possible.

In some examples, the order in which the suggestions are presented in the list can also correspond to the rankings of the one or more airport groups and/or one or more airports selected by the segment application 132. In some implementations, the segment application 132 can determine the ranking for each of one or more airport groups and/or each of one or more airports in a manner such that a measure of demand for segments to and from a given airport group or airport that is relatively high in value can correspond to a relatively high ranking for the given airport group or airport. In this way, the segment application 132 can present the client with suggestions for some of the most popular and in-demand departure and destination locations.

Given that there are three to four times more private airports in the world than commercial airports, many clients may not be aware of the full spectrum of airport options that a given metropolitan area has to offer. As such, the suggestions that are presented by the segment application 132 can serve to simplify and streamline the segment creation process for many clients by enabling such clients to quickly and easily discover and select airports for their segment. This functionality is described in further detail below with reference to FIGS. 2A-7.

FIGS. 2A-2B are illustrations of example interactive graphical interfaces for creating a new private jet segment, e.g., a new private jet charter segment. The segment application 132 can present the interfaces to a client in order to enable the client to configure a custom charter segment from an origin to a destination by interacting with the interfaces to select attributes for the charter segment. The interfaces can also allow the user to go backwards, e.g., to modify a previously selected attribute. The segment application 132 can generate and update the interfaces based on segment information 136 received from the segment management system 110. Thus, the updates can, in some implementations, be caused or initiated by the segment management system 110.

Referring the FIG. 2A, a route selection interface 210 enables the user to select the route for the segment. The route selection interface 210 includes a departure selection element 211 and a destination selection element 212. In some implementations, the client can enter, e.g., type, an airport or name of a geographic region (e.g., city) into the departure selection element 211 and the destination selection element 212. In some implementations, user interaction with, e.g., selection of, the departure selection element 211 or the destination selection element 212 causes the segment application 132 to present the airport selection interface 220 of FIG. 2B. After selecting an airport or airport group using the interface 220 of FIG. 2B, the segment application 132 can return to the interface 210 so that the client can select the other airport (e.g., to select the destination airport after selecting the departure airport) or view the two airports.

Referring to FIG. 2B, the example airport selection interface 220 includes a text entry field 221 in which a client can enter the name of a geographic region (e.g., city) or airport. The segment application 132 can include an auto-complete engine 133 that predicts the geographic region (e.g., airport group) or airport being entered based on the text that the client has entered and presents the predicted geographic region (e.g., airport group) or airport in an airport selection list interface 222. In the example of FIG. 2B, the segment application 132 has predicted that the client is entering "Albuquerque" based on the partial text "Albuq" in the text entry field 221. The data identifying "Albuquerque" as presented in the airport selection list interface 222 of FIG. 2B may represent both an auto-completion of the partial text "Albuq" entered into the text entry field 221 (e.g., as generated at least in part by using an auto-complete engine) and a textual identifier that is associated with a particular airport group including airports identified as being located in the Albuquerque metropolitan area (e.g., Albuquerque Intl airport, Santa Fe Muni airport, Double Eagle li airport, etc.). In some examples, in place of or in addition to the auto-complete engine 133, the segment management system 110 can include an auto-complete engine that predicts the geographic region (e.g., airport group) or airport being entered based on the text that the client has entered and presents the predicted geographic region (e.g., airport group) or airport in an airport selection list interface 222.

The airport selection list interface 222 can also include, for each of one or more predicted geographic regions (e.g., airport groups), a list of one or more airports for that geographic region. In the example depicted in FIG. 2B, the airport selection list interface 222 includes three different airports for Albuquerque (of course there may be other quantities of airports for other cities or for Albuquerque). That is, there are three airports identified as belonging to the "Albuquerque" airport group.

As mentioned above, in some implementations, the segment application 132 can generate a score for each of one or more predicted geographic regions that is reflective of a level of confidence that the text entered into the text entry field 221 corresponds to the respective predicted geographic region and present the airport selection list interface 222 based at least in part on the generated scores. For example, the segment application 132 may only present each of one or more predicted geographic regions in the airport selection list interface 222 if the score generated for the respective predicted geographic region exceeds one or more minimum threshold values. The level of confidence can be based on a level of match between the entered text and the name of the region. The level of confidence can be based on a total number of times or a frequency at which the region is selected by a user after the text is entered by a user.

In at least some of these implementations, the segment application 132 can determine a ranking of each of the one or more predicted geographic regions based on the generated scores and present the one or more predicted geographic regions in the airport selection list interface 222 based on the determined rankings. For example, the segment application 132 can present only a top-ranking subset of the one or more predicted geographic regions in the airport selection list interface 222, present the one or more predicted geographic regions or the top-ranking subset thereof in the airport selection list interface 222 in ranked order, or a combination thereof. In some such implementations, the airport selection list interface 222 may only provide a list or breakdown of airports for each predicted geographic region (e.g., list identifying three airports for Albuquerque) that satisfies one or more criteria. For example, in such implementations, the airport selection list interface 222 may only provide a list or breakdown of airports for the top-ranking predicted geographic region and may only do so in response to the segment application 132 determining that the score generated for the top-ranking predicted geographic region exceeds one or more threshold values.

The client can select one of the airports from the airport selection list interface 222 or a group of (e.g., all) airports for the geographic region by selecting the geographic region instead. In response, the segment application 132 can assign that airport (or region) as the departure airport or destination airport based on which airport selection element 211 or 212 was selected or otherwise interacted with in the interface 210. The segment application 132 can also return to the interface 210 and present the selected airport (or region) in the appropriate airport selection element 211 or 212. After selecting both the departure and destination airports or regions, the segment application 132 can transition to one or more user interfaces or screens associated with one or more segments between the departure and destination airports or regions. Such one or more interfaces or screens can include one or more interfaces or screens (e.g., a date selection interface, a time selection interface, an amount selection interface, an airport selection interface, a jet selection interface, a segment customization interface that enables the client to customize at least some of the attributes of the client-initiated segment from a single interface, etc.) that serve to collect additional information associated with one or more segments between the departure and destination airports or regions (e.g., a preferred date and/or time of departure, a preferred date and/or time of arrival, a preferred amount range, a preferred departure airport in a selected departure region, a preferred destination airport in a selected destination region, a preferred type of jet, etc.) from the client and/or one or more interfaces or screens (e.g., a segment customization interface that enables the client to customize at least some of the attributes of the client-initiated segment from a single interface, a map interface that shows one or more geographical maps of the departure and destination airports or regions, a checkout interface, etc.) that serve to present additional information associated with one or more segments between the departure and destination airports or regions to the client (e.g., dates and/or times of departure and arrival for one or more available segments, amounts associated with one or more available segments, departure and destination airports associated with one or more available segments, types of jets associated with one or more available segments, etc.).

FIGS. 3A-3F are illustrations of example interactive graphical interfaces for creating a new private jet charter segment. More specifically, FIGS. 3A-3F show example interactive graphical interfaces that are presented by a computing device (e.g., displayed by a device of a client) in various time-sequenced stages "A" to "F," respectively. Briefly, and as described in further detail below, in FIGS. 3A-3F, an application that operates on a computing device, which may be similar or equivalent to that of the segment application 132 that operates on the client device 130, as described above with reference to FIGS. 1-2B, is leveraged by a client to create a new private jet segment.

Figures 3A, 3B, 3C:
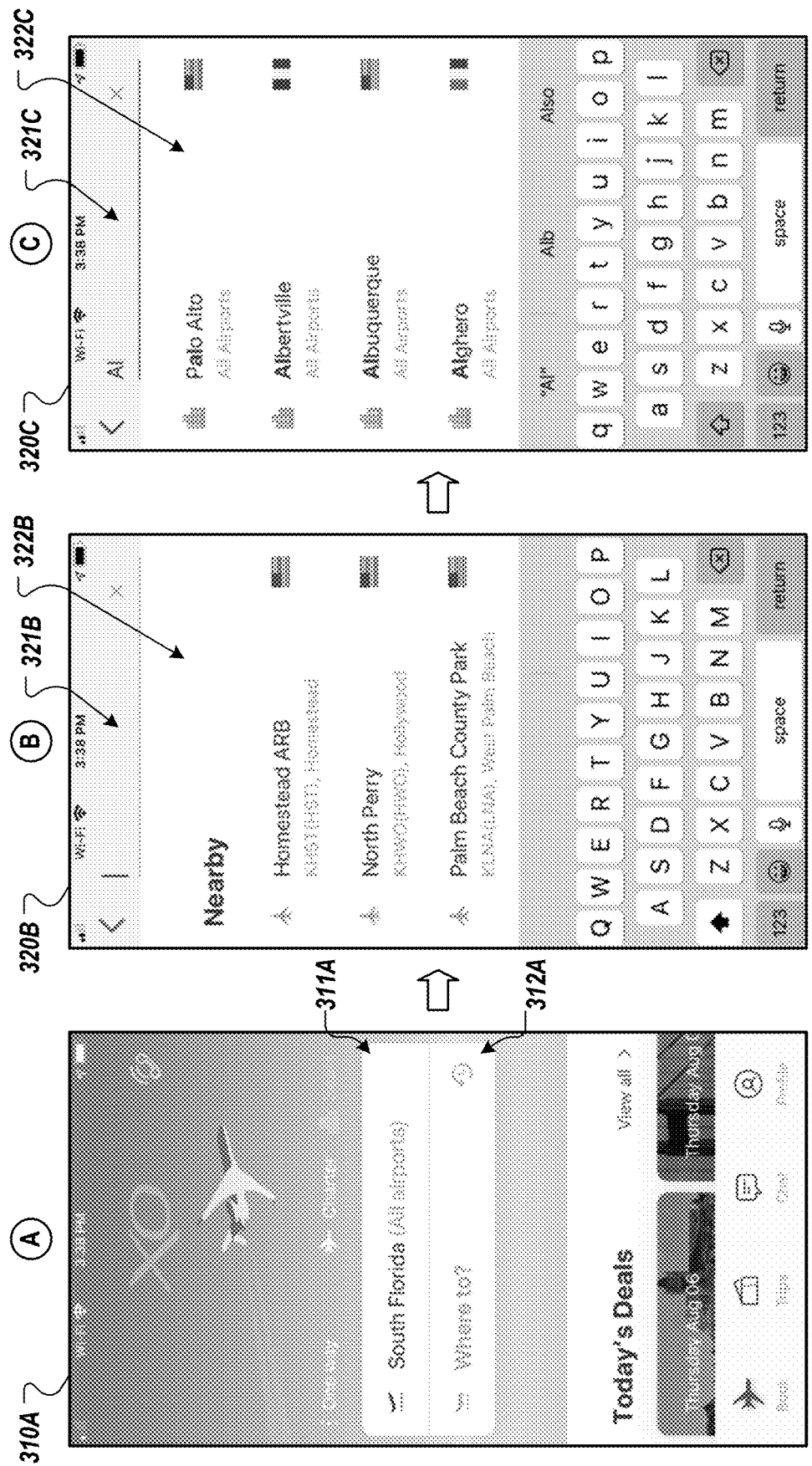
Figures 3D, 3E, 3F:
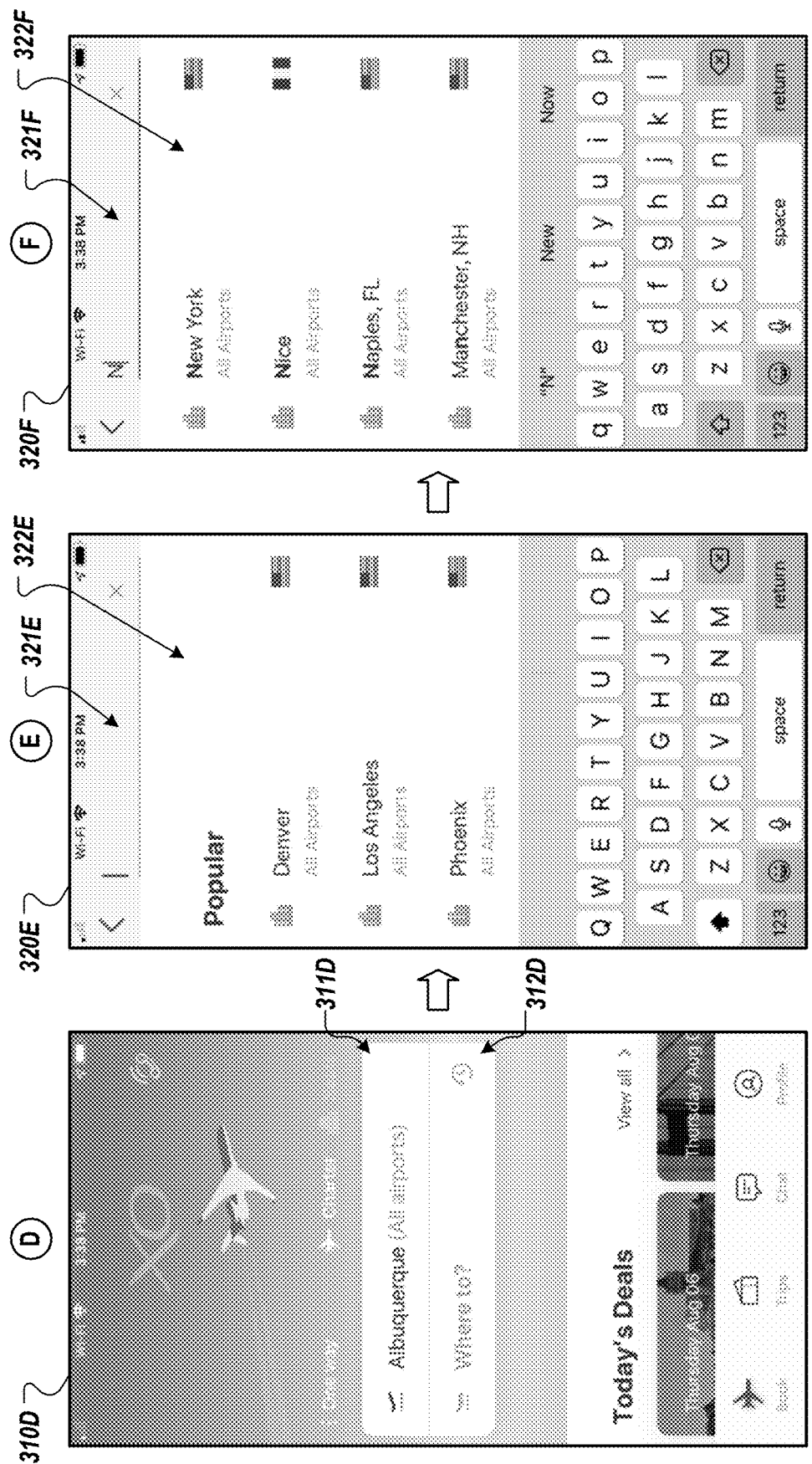

FIGS. 3A and 3D show route selection interfaces 310A and 310D, respectively, which can correspond to a route selection interface 310 as presented by a computing device in stages A and D, respectively. In some examples, the route selection interface 310 can be similar or equivalent to that of the route selection interface 210, as described above with reference to FIG. 2A. Route selection interfaces 310A and 310D include departure selection elements 311A and 311D, respectively, which may correspond to a departure selection element 311 as presented by a computing device in stages A and D, respectively. In some examples, the departure selection element 311 can be similar or equivalent to that of the departure selection element 211 of FIG. 2A. In addition, route selection interfaces 310A and 310D also include destination selection elements 312A and 312D, respectively, which may correspond to a destination selection element 312 as presented by a computing device in stages A and D, respectively. In some examples, the destination selection element 312 may be similar or equivalent to that of the destination selection element 212 of FIG. 2A.

FIGS. 3B, 3C, 3E and 3F show airport selection interfaces 320B, 320C, 320E, and 320F, respectively, which can correspond to an airport selection interface 320 as presented by a computing device in stages B, C, E, and F, respectively. In some examples, the airport selection interface 320 can be similar or equivalent to that of the airport selection interface 220, as described above with reference to FIG. 2B. Airport selection interfaces 320B, 320C, 320E, and 320F include text entry fields 321B, 321C, 321E, and 321F, respectively, which may correspond to a text entry field 321 as presented by a computing device in stages B, C, E, and F, respectively. In some examples, the text entry field 321 can be similar or equivalent to that of the text entry field 221 of FIG. 2B. In addition, airport selection interfaces 320B, 320C, 320E, and 320F also include airport selection list interfaces 322B, 322C, 322E, and 322F, respectively, which can correspond to an airport selection list interface 322 as presented by a computing device in stages B, C, E, and F, respectively. In some examples, the airport selection list interface 322 can be similar or equivalent to that of the airport selection list interface 222 of FIG. 2B.

In the example depicted in FIGS. 3A-3F, a client that is physically located in South Florida uses an application that operates on a computing device (e.g., mobile phone belonging to the client) to create a new private jet segment (e.g., private jet flight) from Albuquerque to New York. Stage A can be representative of a point in time at or shortly after which the client launches or otherwise opens the application on the computing device. In stage A, the application presents the route selection interface 310A. In the particular example depicted in FIG. 3A, upon being launched, the application has determined that the computing device is currently located in the "South Florida" region (e.g., based on GPS data) and, based on this determination, has populated the departure selection element 311 of the route selection interface 310 with text specifying "South Florida" as the departure region by default for the client's convenience. Such functionality can be advantageous, as some clients may wish to create segments from their current location. However, in some implementations, the application may not populate the departure selection element 311 by default. Given that the client wishes to create a segment from Albuquerque, the client may tap, select, or otherwise interact with the departure selection element 311 to begin entering the appropriate text.

Stage B can be representative of a point in time at or shortly after which the client taps, selects, or otherwise interacts with the departure selection element 311. In stage B, the application presents the airport selection interface 320B in response to detecting the client's interaction with the departure selection element 311. In the particular example depicted in FIG. 3B, the application has populated the airport selection list interface 322 with data identifying multiple "nearby" airports, all of which are located in the South Florida region, based on the determined location of the computing device. Much like the functionality described above with reference to the example depicted in FIG. 3A, this functionality can be advantageous, as some clients may wish to create segments from their current location. However, in some implementations, the application may not populate the airport selection list interface 322 with data identifying multiple nearby airports by default. Given that the client wishes to create a segment from Albuquerque, the client may begin enter the appropriate text into the text entry field 321.

Stage C can be representative of a point in time at or shortly after which the client enters partial text "Al" into the text entry field 321. In stage C, the application presents the airport selection interface 320C in response to receiving data indicating partial text "Al" entered into the text entry field 321. In the particular example depicted in FIG. 3C, the application has updated the airport selection list interface 322 to present data identifying a list of geographic regions predicted or otherwise selected based on the partial text "Al" entered into the text entry field 321. The data identifying each geographic region as presented in the airport selection list interface 322 in stage C (e.g., "Palo Alto," "Albertville," "Albuquerque," "Alghero," etc.) may represent both an auto-completion of the partial text "Al" entered into the text entry field 321 (e.g., as generated at least in part by using an auto-complete engine, such as auto-complete engine 133) and a textual identifier that is associated with the respective geographic region or airport group. Given that the airport selection list interface 322C includes data identifying the "Albuquerque" region, the client may tap or otherwise interact with the "Albuquerque" entry in the airport selection list interface 322C to select Albuquerque as the departure region for the client-initiated segment. However, if the client were to continue to enter the appropriate text into the text entry field 321 (e.g., enter partial text "Albuq"), then the application might proceed to update the airport selection list interface 322 to reflect the airport selection list interface 222 shown in FIG. 2B. In some examples, the airport selection list interface 322, as presented in stage C, can present both data identifying each of one or more airport groups and data identifying each of one or more airports. For instance, in addition to presenting data identifying the "Palo Alto," "Albertville," "Albuquerque," and "Alghero" airport groups, the airport selection list interface 322C can further present data identifying "Charlottesville-Albermarle" airport in Charlottesville, VA and "Albert J Ellis" airport in Jacksonville, FL, both of which contain partial text "Al" entered into the text entry field 321. In some examples, the client may need to scroll through the airport selection interface 320 in order to view additional airport groups and/or airports identified in the airport selection list interface 322.

Stage D can be representative of a point in time at or shortly after which the client selects Albuquerque as the departure region (or selects an airport in the Albuquerque region as the departure airport) for the client-initiated segment. Given that the client wishes to create a segment from Albuquerque to New York, the client may tap, select, or otherwise interact with the destination selection element 312 to begin entering text corresponding to New York.

Stage E can be representative of a point in time at or shortly after which the client taps, selects, or otherwise interacts with the departure selection element 312. In stage E, the application presents the airport selection interface 320E in response to detecting the client's interaction with the departure selection element 312. In the particular example depicted in FIG. 3E, the application has populated the airport selection list interface 322 with data identifying multiple "popular" airports and/or regions (e.g., Denver, Los Angeles, Phoenix, etc.) for the client's convenience, based on the selected departure airport or region (e.g., Albuquerque). Such "popular" airports and/or regions may represent the airports and/or regions to which client-initiated segments from the selected departure airport or region most often arrive, and may be identified based on any of a variety of information, such as historical data for previous client-initiated segments. Much like the functionalities described above with reference to the examples depicted in FIGS. 3A-3B, this functionality can be advantageous, as many client wish to create segments to such popular destination airports and/or regions. However, in some implementations, the application may not populate the airport selection list interface 322 with data identifying multiple popular destination airports and/or regions by default. Given that the client wishes to create a segment from Albuquerque to New York, the client may begin enter text corresponding to New York into the text entry field 321.

Stage F can be representative of a point in time at or shortly after which the client enters partial text "N" into the text entry field 321. In stage F, the application presents the airport selection interface 320F in response to receiving data indicating partial text "N" entered into the text entry field 321. In the particular example depicted in FIG. 3F, the application has updated the airport selection list interface 322 to present data identifying a list of geographic regions predicted or otherwise selected based on the partial text "N" entered into the text entry field 321. The contents of the airport selection interface 320F are described in additional detail below with reference to airport selection interfaces 420A and 520A of FIGS. 4 and 5, respectively. The data identifying each geographic region as presented in the airport selection list interface 322 in stage F (e.g., "New York," "Nice," "Naples, FL," "Manchester, NH," etc.) may represent both an auto-completion of the partial text "N" entered into the text entry field 321 (e.g., as generated at least in part by using an auto-complete engine, such as auto-complete engine 133) and a textual identifier that is associated with the respective geographic region or airport group.

In some examples, the airport selection list interface 322, as presented in stage F, can present both data identifying each of one or more airport groups and data identifying each of one or more airports. For instance, in addition to presenting data identifying the "New York," "Nice," "Naples, FL," and "Manchester, NH" airport groups, the airport selection list interface 322F can further present data identifying "New Bedford Regional" airport in New Bedford, MA and "Easton/Newman Field" airport in Easton, MD, both of which contain partial text "N" entered into the text entry field 321. In some examples, the client may need to scroll through the airport selection interface 320 in order to view additional airport groups and/or airports identified in the airport selection list interface 322.

In some implementations, the airport selection list interface 322 can present an icon or other graphical element beside each listed identifier to assist the client in distinguishing airport groups or geographic regions from airports. For instance, the airport selection list interface 322 can present an icon or other graphical element beside each listed identifier associated with an airport that is similar to one or more of those depicted to the left of the identifiers presented in the airport selection list interface 322B (e.g., an icon of an airplane), and can present an icon or other graphical element beside each listed identifier associated with an airport groups or geographic region that is similar to one or more of those depicted to the left of the identifiers presented in the airport selection list interface 322C (e.g., an icon of a city skyline).

In some implementations, the airport selection list interface 322 can present an icon or other graphical element beside each airport group or airport listed that is indicative of a location of the respective airport group or airport. For instance, the airport selection list interface 322 may present an icon or other graphical element beside each airport group or airport listed representative of a flag of a country, territory, state, or province within which the respective airport group or airport is located. In some examples, icons or graphical elements that are similar or equivalent to one or more of the aforementioned icons or graphical elements may be presented in one or more airport selection list interfaces that are similar or equivalent to one or more of airport selection list interfaces 222, 422, 522, and 622, as described herein with reference to FIGS. 2 and 4-6.

Given that the airport selection list interface 322C includes data identifying the "New York" region, the client may tap or otherwise interact with the "New York" entry in the airport selection list interface 322C, which is the top-ranking entry, to select New York as the destination region for the client-initiated segment. However, if the client were to continue to enter the appropriate text into the text entry field 321 (e.g., enter partial text "New"), then the application might proceed to update the airport selection interface 320F to reflect any of airport selection interfaces 420B, 520B, and 620B, as described in further detail below with reference to FIGS. 4, 5, and 6B, respectively. Upon selecting New York as the destination region (or selecting an airport in the New York region as the destination airport) for the client-initiated segment, the application might transition to one or more user interfaces or screens that serve to collect additional information associated with the client-initiated segment from the client and/or present additional information associated with the client-initiated segment to the client.

Figure 4:
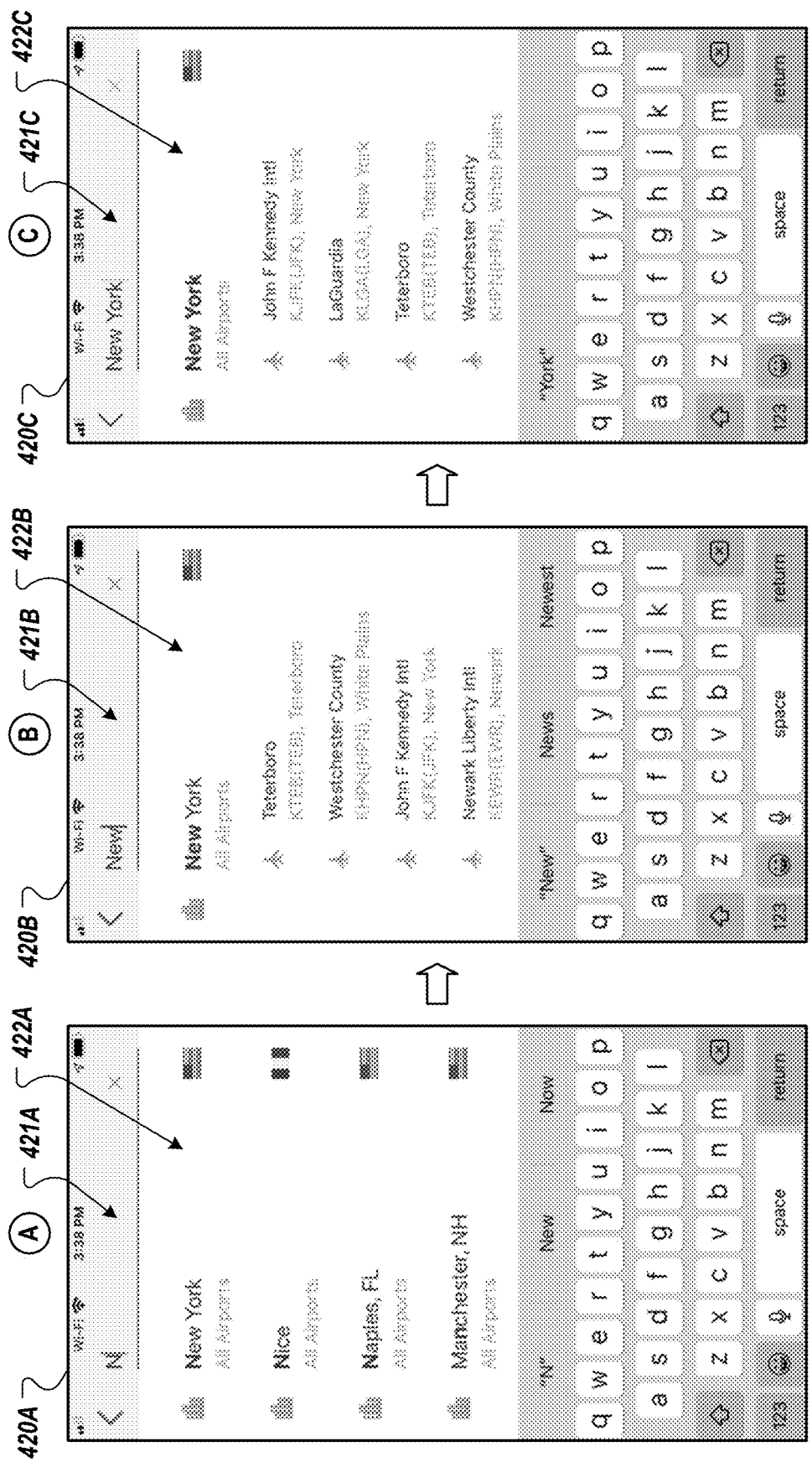
Figure 5:
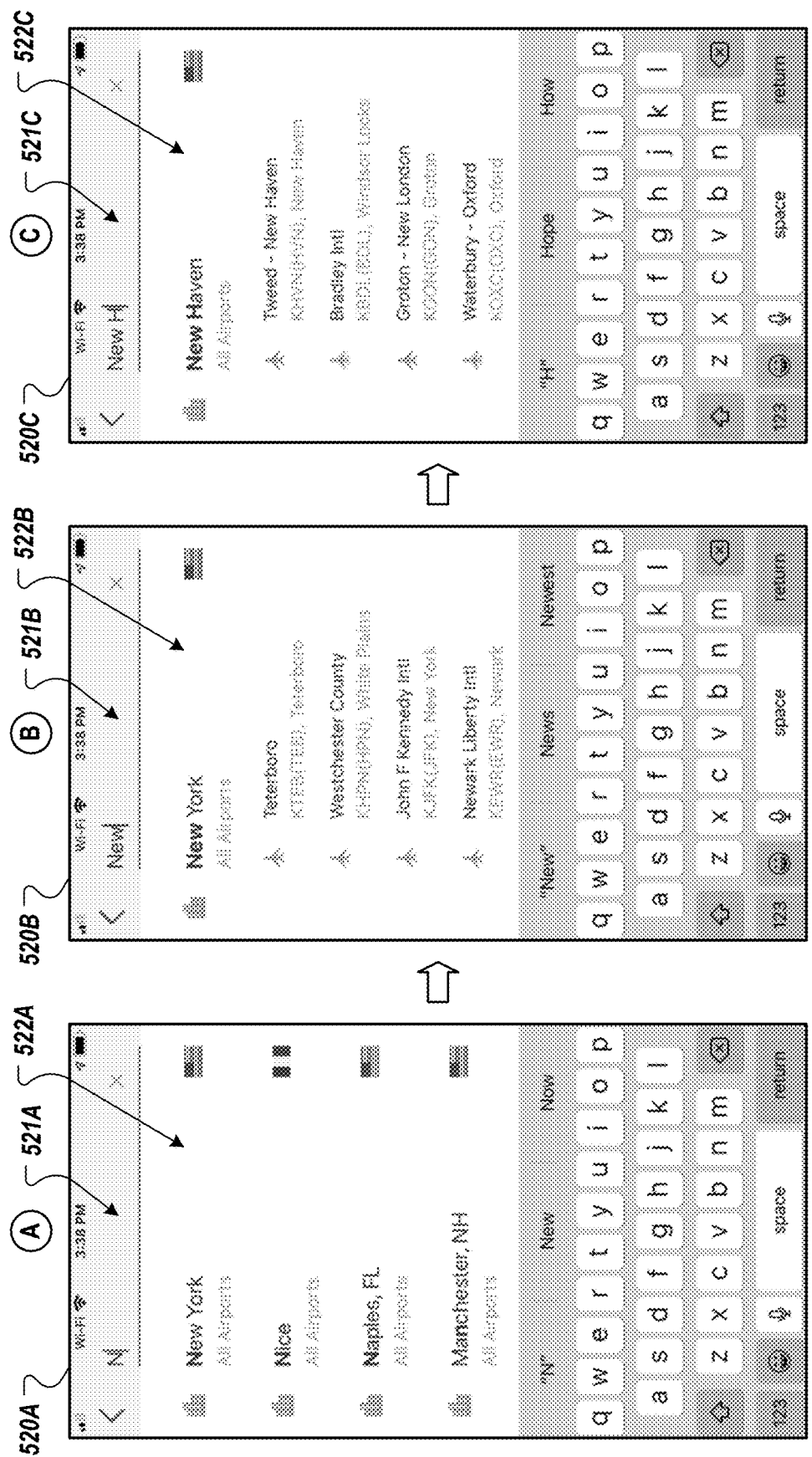

FIGS. 4 and 5 depict example interactive graphical interfaces for creating a new private jet charter segment. More specifically, FIG. 4 depicts example interactive graphical interfaces 420A to 420C that correspond to an airport selection interface 420 as presented by a computing device (e.g., displayed by a device of a client) in various time-sequenced stages "A" to "C," respectively, and FIG. 5 depicts example interactive graphical interfaces 520A to 520C that correspond to an airport selection interface 520 as presented by a computing device (e.g., displayed by a device of a client) in various time-sequenced stages "A" to "C," respectively. Airport selection interfaces 420A to 420C include text entry fields 421A to 421C, respectively, which can correspond to a text entry field 421 as presented by a computing device in stages A to C, respectively, and airport selection interfaces 520A to 520C include text entry fields 521A to 521C, respectively, which may correspond to a text entry field 521 as presented by a computing device in stages A to C, respectively. Similarly, airport selection interfaces 420A to 420C also include airport selection list interfaces 422A to 422C, respectively, which may correspond to an airport selection list interface 422 as presented by a computing device in stages A to C, respectively, and airport selection interfaces 520A to 520C include also include airport selection list interfaces 522A to 522C, respectively, which may correspond to an airport selection list interface 522 as presented by a computing device in stages A to C, respectively. Briefly, and as described in further detail below, in one or both of FIGS. 4 and 5, an application that operates on a computing device, which can be similar or equivalent to that of the segment application 132 that operates on the client device 130, as described above with reference to FIGS. 1-2B, is leveraged by a client to create a new private jet segment.

FIGS. 4 and 5 show airport selection interfaces 420A and 520A, respectively, which, in some examples, can correspond to the airport selection interface 320F, as depicted in FIG. 3F. That is, in some examples, stage A in each of FIGS. 4 and 5 can correspond to stage F as described above with reference to FIG. 3F. For sake of brevity, airport selection interfaces 420A and 520A and other aspects of FIGS. 4 and 5 will, in some instances herein, both be described with reference to FIG. 4. As such, it is to be understood that descriptions of airport selection interface 420A, text entry field 421A, and airport selection list interface 422A can also extend to airport selection interface 320F, text entry field 321F, and airport selection list interface 322F, respectively, as well as to airport selection interface 520B, text entry field 521B, and airport selection list interface 522B, respectively.

In FIG. 4, in stage A the application presents the airport selection interface 420A in response to receiving data indicating partial text "N" entered into the text entry field 421. As shown in FIG. 4, the application has updated the airport selection list interface 422 to present data identifying a list of geographic regions (e.g., airport groups) predicted or otherwise selected based on the partial text "N" entered into the text entry field 421. Each airport group can correspond to a respective geographic region. In some examples, such data can represent a list of suggestions. As mentioned above, in some implementations, the application can generate a score for each of one or more predicted geographic regions (e.g., airport groups) that is reflective of a level of confidence that text entered into a text entry field (e.g., text entry field 421) corresponds to the respective predicted geographic region, and can and present an airport selection list interface (e.g., airport selection list interface 422) based at least in part on the generated scores. Given that all of the geographic regions (e.g., airport groups) that are presented in the airport selection list interface 422 are associated with identifiers that contain the letter "n" (e.g., New York, Nice, Naples, Manchester), it follows that the example depicted in FIG. 4 can represent one example in which such scores are generated and utilized by the application. That is, the geographic regions included in the airport selection list interface 422 may have been identified by the application as relevant to the partial text entered into the text entry field 421 by the client.

The order in which the suggested geographic regions are presented in the airport selection list interface 422 can also correspond to rankings determined for the geographic regions. In the example depicted in FIG. 4, the rankings for the geographic regions were determined (e.g., by the application) in a manner such that measures of demand for segments to and from airport groups that are relatively high in value can correspond to relatively high rankings. Indeed, as demonstrated in FIG. 4, the measured demand for segments to and from airports in the New York metropolitan area (e.g., airport group) outranks that of the other airport groups identified in the airport selection list interface 422 (e.g., corresponding to Nice, Naples, and Manchester). The measured demand for segments to and from airports in the New York metropolitan area may be relatively high in value by virtue of one or more factors including the relatively high number of airports encompassed by the area and the relatively high amount of travel to and from the area.

In one or both of FIGS. 4 and 5, stage B can be representative of a point in time at or shortly after which the client enters partial text "New" into the text entry field 421. FIGS. 4 and 5 show airport selection interfaces 420B and 520B, respectively, which, in some examples, can be similar or equivalent to one another. For sake of brevity, airport selection interfaces 420B and 520B and other aspects of FIGS. 4 and 5 will, in some instances herein, both be described with reference FIG. 4. As such, it is to be understood that descriptions of airport selection interface 420B, text entry field 421B, and airport selection list interface 422B can also extend to airport selection interface 520B, text entry field 521B, and airport selection list interface 522B, respectively. In stage B in FIG. 4, the application presents the airport selection interface 420B in response to receiving data indicating partial text "New" entered into the text entry field 421. As shown in each of FIGS. 4 and 5, the application has updated the airport selection list interface 422 to present data based at least in part on the partial text "New" entered into the text entry field 421. As mentioned above, in some implementations, the application can update an airport selection list interface (e.g., airport selection list interface 422) to present a list or breakdown of airports for the top-ranking predicted geographic region (e.g., New York), but may only do so in response to determining that a score (e.g., score reflective of a level of confidence that text entered into text entry field 421 corresponds to the respective predicted geographic region) generated for the top-ranking predicted geographic region score exceeds one or more threshold values. Given that several airports included in the New York metropolitan area airport group are identified in the airport selection list interface 422B (e.g., Teterboro airport, Westchester County airport, John F Kennedy Intl airport, Newark Liberty Intl airport, and so on) as depicted in FIG. 4, it follows that the example depicted in FIG. 4 can represent one example in which the application makes such a determination that the score generated for the top-ranking predicted geographic region exceeds one or more threshold values.

As mentioned above with reference to FIG. 3F and demonstrated by the airport selection interface 420B, in some examples, the airport selection list interface 422 can present an icon or other graphical element beside each listed identifier to assist the client in distinguishing airport groups or geographic regions from airports. Indeed, in the example of FIG. 4, the airport selection list interface 422B presents an icon of a city skyline to the left of the identifier associated with the New York metropolitan area airport group (e.g., "New York") and presents an icon of an airplane next to each of the several identifiers associated with each of the several airports included in the New York metropolitan area (e.g., "Teterboro" airport, "Westchester County" airport, "John F Kennedy Intl" airport, "Newark Liberty Intl" airport, etc.), respectively. It should be noted that the list of airports provided in the airport selection list interface 422B as depicted in FIG. 4 may not represent the entire list of airports that are included in the New York metropolitan area airport group. For instance, in some examples, the client may need to scroll through the airport selection interface 420 in order to view additional airports identified in the airport selection list interface 422. It should also be noted that the list of airport groups provided in the airport selection list interface 422B as depicted in FIG. 4 may also not represent the entire list of airport groups identified in the airport selection list interface 422. For example, in stage B, the airport selection list interface 422 might additionally present (e.g., beneath the data identifying the New York metropolitan area airport group and the several airports included therein) data identifying the "New Haven" airport group, the "New Orleans" airport group, and the "New Delhi" airport group, all of which contain partial text "New" entered into the text entry field 421. In some examples, the client may need to scroll through the airport selection interface 420 in order to view such additional airport groups and/or airports identified in the airport selection list interface 422.

Furthermore, the order in which the airports included in the top-ranking airport group are presented in the airport selection list interface 422B can also correspond to rankings determined for the airports. In the example depicted in each of FIGS. 3F, 4, and 5, rankings for the each of the airports included in the New York metropolitan area airport group are determined (e.g., by the application) in a manner such that measures of demand for segments to and from airports that are relatively high in value can correspond to relatively high rankings.

However, as demonstrated in stage C in the example of FIG. 4, which can follow stage B and be representative of a point in time at or shortly after which the client enters text "New York" into the text entry field 321, the manner in which the rankings are determined (e.g., by the application) for the each of the airports included in the New York metropolitan area airport group also to some extent favors airports that are determined to correspond to text entered into a text entry field with a relatively high level of confidence (e.g., as reflected by scores generated for the airports). As shown in FIG. 4, the application has updated the airport selection list interface 422 based at least in part on the text entered into the text entry field 421 to change the order in which the airports included in the top-ranking airport group are presented. Indeed, as the client fully spells out "New York" in the text entry field 421, the application adjusts its rankings of the airports included in the New York metropolitan area airport group to favor airports that located in the state of New York (e.g., John F Kennedy Intl airport, LaGuardia airport, etc.) over airports that are located outside of the state of New York (e.g., Teterboro airport in New Jersey, Newark Liberty Intl in New Jersey, etc.). It should be noted that, much like the list of airports provided in the airport selection list interface 422B, the list of airports provided in the airport selection list interface 422C as depicted in FIG. 4 may not represent the entire list of airports that are included in the New York metropolitan area airport group. In some examples, the client may be able to view the airport selection list interface 422 in its entirety by scrolling through the airport selection interface 420.

In FIG. 5, stage C can follow stage B and be representative of a point in time at or shortly after which the client enters partial text "New H" into the text entry field 521. In stage C in the example of FIG. 5, the application presents the airport selection interface 520C in response to receiving data indicating partial text "New H" entered into the text entry field 521. As shown in FIG. 5, the application has updated the airport selection list interface 522 to present data based at least in part on the partial text "New H" entered into the text entry field 521. As mentioned above, in some implementations, the application can update an airport selection list interface (e.g., airport selection list interface 522) to present a list or breakdown of airports for the top-ranking predicted geographic region in response to determining that a score (e.g., score reflective of a level of confidence that text entered into text entry field 521 corresponds to the respective predicted geographic region) generated for the top-ranking predicted geographic region score exceeds one or more threshold values.

Indeed, the example depicted in FIG. 5 may represent one example in which the application makes such a determination that the score generated for the top-ranking predicted geographic region exceeds one or more threshold values. As shown in FIG. 5, the application has updated the airport selection list interface 522 based at least in part on the text entered into the text entry field 521 to present to identify the New Haven metropolitan area as the top-ranking airport group (instead of the New York metropolitan area), and to present a list of several airports included in the New Haven metropolitan area (e.g., Tweed-New Haven airport, Bradley Intl airport, Groton-New London airport, Waterbury-Oxford airport, and so on). That is, in transitioning from stage B to stage C, the application adjusts the score generated and/or ranking determined for each of one or more airport groups (including the New York metropolitan area airport group and the New Haven metropolitan area airport group), determines that the New Haven metropolitan area airport group outranks the New York metropolitan area airport group as the top-ranking airport group, determines that the updated score generated for the New Haven metropolitan area airport group exceeds one or more threshold values, and updates the airport selection list interface 522 accordingly. In some examples, in transitioning from stage B to stage C, the application further determines that the updated score generated for the New York metropolitan area airport group does not exceed the one or more threshold values.

Figures 6A, 6B, 6C:
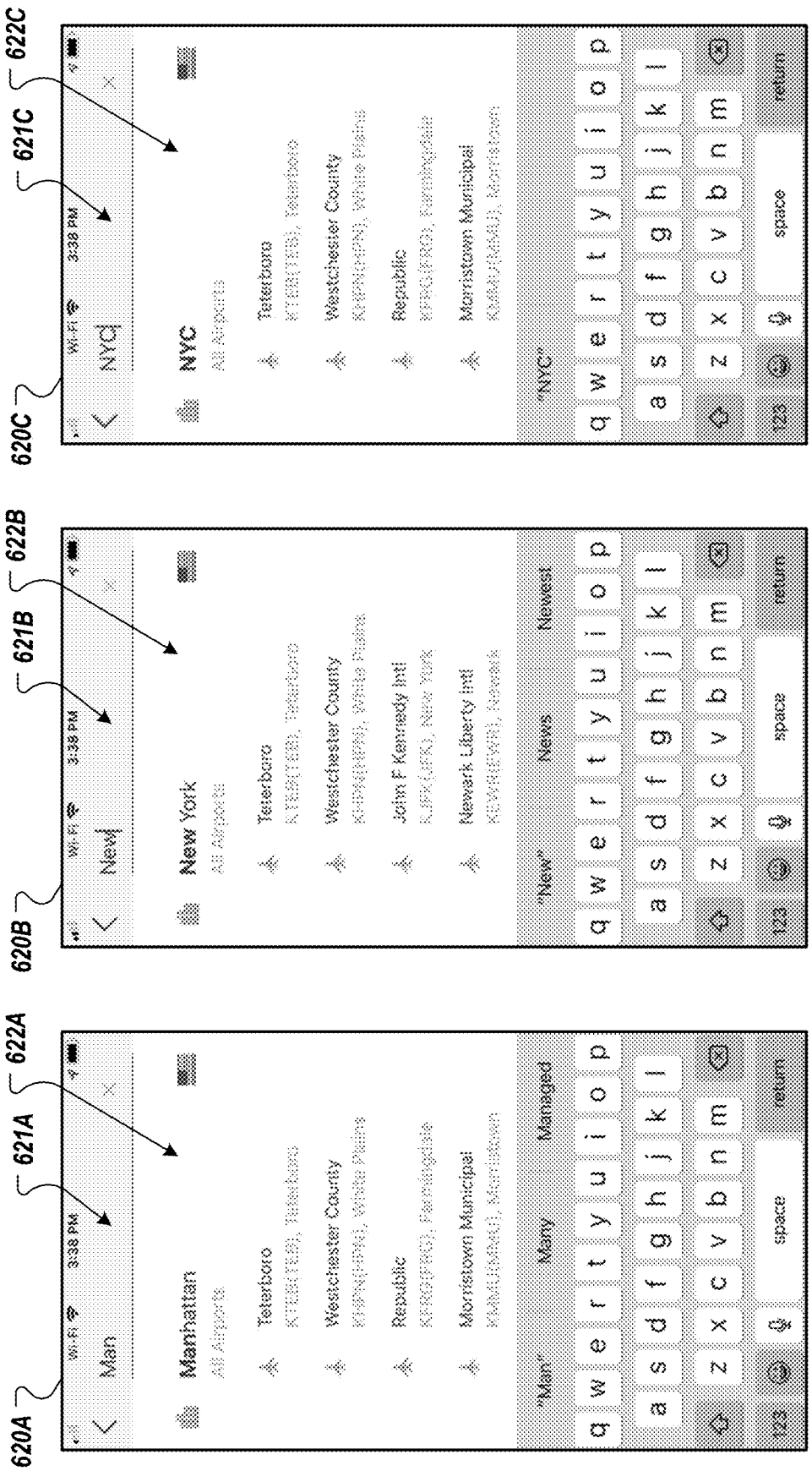

FIGS. 6A-6C depict example interactive graphical interfaces for creating a new private jet charter segment. More specifically, FIGS. 6A, 6B, and 6C depict example interactive graphical interfaces 620A, 620B, and 620C, respectively, that are presented by a computing device (e.g., displayed by a device of a client) in various stages. As mentioned above, in some implementations, one or more identifiers (e.g., textual identifiers) may be associated with each airport group and can be representative of the geographic region to which each airport group corresponds. In the example of FIGS. 6B and 6C, an airport group including airports that are located in and around the New York City metropolitan area is associated with textual identifiers including "New York" and "NYC," respectively. As shown in FIG. 6A, in one example, the airport group of the aforementioned example can also be associated with the identifier of "Manhattan." In some examples, the one or more identifiers that are associated with each of one or more airport groups can include one or more textual identifiers that are associated with each of one or more of the airports that are included in the respective airport group. For instance, the New York metropolitan area airport group can be associated with textual identifiers including "Teterboro," "KTEB," "West Chester County," "White Plains," and so on.

In another example, only a subset of airports in the airport group of the aforementioned example can also be associated with the identifier of "Manhattan," as shown in FIG. 6A. The airport group that is associated with the "Manhattan" identifier can, for instance, represent a subgroup or "subzone" of the New York metropolitan area airport group. That is, in some implementations, one or more airport groups can include one or more subgroups or subzones (e.g., corresponding to specific boroughs or communities within an airport group). In some examples, subgroups or subzones within an airport group can be determined or identified in a manner similar to that in which airport groups are determined are identified. For instance, in these examples, a subgroup or subzone can represent a portion of a geographic region for which the demand for segments to and from is disproportionately higher than it is for other portions of the geographic region. In at least some of these examples, one or more techniques similar or equivalent to one or more of those described above with reference to airport grouping engine 119 of the segment management 110 of FIG. 1 (e.g., clustering or cluster analysis techniques, heat mapping and/or hot spot mapping techniques, techniques that involve evaluating the number of times that clients select airports or other quantities determined on the basis thereof against one or more thresholds, etc.) can be applied for the purposes of determining or identifying subgroups or subzones within geographic regions that are associated with airport groups.

In yet another example, the airport group that is associated with the "Manhattan" identifier can, for instance, represent a standalone airport group. While some or all of the airports included in such a standalone airport group (e.g., the airport group associated with the "Manhattan" identifier) can also be included in another airport group (e.g., the New York metropolitan area airport group), such a standalone airport group may not necessarily represent a subgroup, subzone, or portion of the other airport group. That is, in some implementations, each of one or more airports can belong to one or more airport groups. In other implementations, a single airport may only belong to a maximum of one airport group. In the event that, in such implementations, a single airport falls within the boundaries defined for two or more airport groups, such an airport can be assigned to the geographically-closest one of the two or more airport groups. In some examples, the geographically-closest airport group can be the airport group that, out of the two or more overlapping airport groups, is defined by a center location that is a shortest distance away from the airport.

Figure 7:
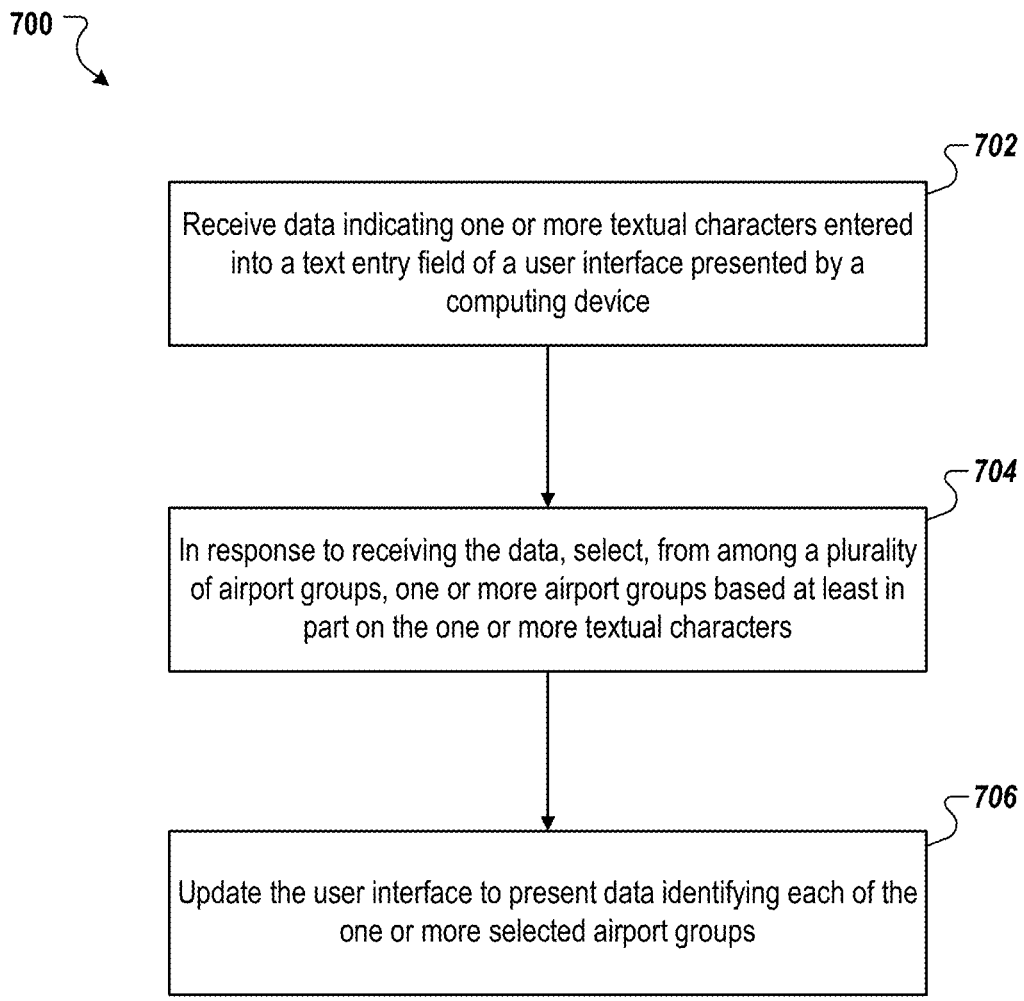
FIG. 7 is a flow chart of an example process for creating a new private jet charter segment.

FIG. 7 is a flow chart of an example process 700 for creating a new private jet charter segment. Operations of the process 700 can be implemented by one or more computing devices) such as the client device 130 and/or the segment management system 110 of FIG. 1. Operations of the process 700 can also be implemented as instructions stored on a computer readable medium, e.g., non-transitory computer readable medium, where execution of the instructions by one or more computing devices or data processing apparatus cause the one or more computing devices or data processing apparatus to perform operations of the process 700. For convenience, the process 700 will be described as being performed by a system of one or more computing devices located in one or more locations.

The system receives data indicating one or more textual characters entered into a text entry field of a user interface presented by a computing device (step 702). For example, this can correspond to a computing device on which an application similar to that of application 132, as described above with reference to FIG. 1, is running receiving text entered into a text entry field similar or equivalent to one or more of text entry fields 211, 212, 221, 311, 312, 321, 421, 521, and 621, as described above with reference to FIGS. 2A-6. For instance, such one or more textual characters can correspond to at least a portion of a name of a geographic location specified by a client as a departure or destination location for a segment.

In response to receiving the data indicating the one or more textual characters, the system selects, from among a plurality of airport groups, one or more airport groups based at least in part on the one or more textual characters (step 704) and updates the user interface to present data identifying each of the one or more selected airport groups (step 706). For example, this can correspond to a computing device on which an application similar to that of application 132, as described above with reference to FIG. 1, is running selecting one or more airport groups based at least in part text entered into a text entry field and updating an airport selection list interface similar or equivalent to one or more of airport selection list interfaces 222, 322, 422, 522, and 622, as described in further detail below with reference to FIGS. 2A-6.

Each airport group includes a respective subset of a set of airports selected for the airport group based at least in part on historical data for previous client-initiated segments to and from airports in the set of airports. For instance, each airport group can include airports selected for the airport group by the segment management system 110 (e.g., airport grouping engine 119 of the segment management system 110) based at least in part on data similar or equivalent to one or more portions of data stored in one or both of data storage units 122 and 124, as described above with reference to FIG. 1.

In some implementations, the historical data for previous client-initiated segments includes data specifying, for each of multiple geographic locations, a number of times clients selected each airport after searching for segments to or from the geographic location. In at least some of these implementations, to update the user interface to present data identifying each of the one or more selected airport groups (e.g., at step 706), the system updates the user interface to present, for each of the one or more selected airport groups, the subset of airports selected for the selected airport group in order based on a quantity of previous client-initiated segments to and from the airports. This can, for example, correspond to a computing device on which an application similar to that of application 132, as described above with reference to FIG. 1, is running updating an airport selection list interface in a manner similar or equivalent to that which occurs in the transition from stage A to stage B as described above with reference to FIG. 4 or in a manner similar or equivalent to that which occurs in the transition from stage B to stage C as described above with reference to FIG. 4.

In some examples, the historical data includes data indicating a measure of demand for client-initiated segments to and from each of the set of airports, a total number of client-initiated segments to and from each of the set of airports created in a given time period, a total number of client-initiated segments to and from each of the set of airports scheduled for a given time period, a total number of client-initiated searches for each of the set of airports created in a given time period, a frequency at which client-initiated segments to and from each of the set of airports have historically been created, a frequency at which client-initiated segments to and from each of the set of airports have historically occurred, a frequency at which client-initiated searches for each of the set of airports have historically occurred, or a combination thereof. For instance, such data can correspond to that which is determined by the segment management system 110 and/or stored in one or both of storage units 122 and 124, as described above with reference to FIG. 1. In this way, a computing device or system similar or equivalent to the segment management system 110, as described above with reference to FIG. 1, can group airports or identify groups of airports on the basis of popularity and/or demand.

In some implementations, the process 700 can include one or more additional steps in which the system determines a ranking of each of the one or more selected airport groups based at least in part on one or more portions of the historical data, the one or more portions of the historical data including historical data for previous client-initiated segments to and from each airport included in the one or more selected airport groups. In these implementations, to update the user interface to present data identifying each of the one or more selected airport groups (e.g., at step 706), the system updates the user interface to present data identifying each of the one or more selected airport groups in order by ranking. For example, this can correspond to a computing device on which an application similar to that of application 132, as described above with reference to FIG. 1, is running updating an airport selection list interface similar or equivalent to one or more of airport selection list interfaces 222, 322, 422, 522, and 622, as described in further detail below with reference to FIGS. 2A-6, to present data identifying higher ranked airport groups toward the top of the airport selection list interface and lower ranked airport groups toward the bottom of the airport selection list interface (e.g., presented in descending order). For instance, in the example of FIG. 3F, "New York" is the top-ranked airport group.

In some examples, the process 700 can include one or more additional steps in which the system generates, for each of the one or more selected airport groups based at least in part on the one or more textual characters entered into the text entry field of the user interface, a score reflecting a level of confidence that the one or more textual characters entered into the text entry field of the user interface correspond to the respective airport group. In some such examples, to generate the score for each of the one or more selected airport groups based at least in part on the one or more textual characters entered into the text entry field of the user interface, the system generates, for each of the one or more selected airport groups based at least in part on (i) the one or more textual characters entered into the text entry field of the user interface and (ii) one or more portions of the historical data including historical data for previous client-initiated segments to and from the respective airport group, a score reflecting a level of confidence that the one or more textual characters entered into the text entry field of the user interface correspond to the respective airport group. In at least some of these examples, the process 700 can include one or more additional steps in which the system determines a ranking of each of the one or more selected airport groups based at least in part on the scores generated for the one or more selected airport groups. In these examples, to update the user interface to present data identifying each of the one or more selected airport groups (e.g., at step 706), the system updates the user interface to present data identifying each of the one or more selected airport groups in order by ranking. For example, this can correspond to a computing device on which an application similar to that of application 132, as described above with reference to FIG. 1, is running updating an airport selection list interface similar or equivalent to one or more of airport selection list interfaces 222, 322, 422, 522, and 622, as described in further detail below with reference to FIGS. 2A-6, to present data identifying higher ranked airport groups toward the top of the airport selection list interface and lower ranked airport groups toward the bottom of the airport selection list interface (e.g., presented in descending order). For instance, in the example of FIG. 3F, "New York" is the top-ranked airport group.

In some of the aforementioned examples, the process 700 can include one or more additional steps in which the system determines that the score generated for a particular airport group included in the one or more selected airport groups exceeds one or more threshold values, and updates the user interface to present data identifying the particular airport group and data identifying each airport that is included in the particular airport group in response to determining that the score generated for the particular airport group exceeds one or more threshold values. For example, this can correspond to a computing device on which an application similar to that of application 132, as described above with reference to FIG. 1, is running updating an airport selection list interface in a manner similar or equivalent to that which occurs in the transition from stage A to stage B as described above with reference to FIG. 4. More specifically, in the context of the example of FIG. 4, the particular airport group can, for example, correspond to the New York metropolitan area airport group, and the airports that are included in the particular airport group can, for example, correspond to the Teterboro airport, Westchester County airport, John F Kennedy Intl airport, Newark Liberty Intl airport, and so on. In transitioning from stage A to stage B in the example of FIG. 4 (e.g., as the client enters additional text into the text entry field 421), the application generates a score for the New York metropolitan area airport group or updates a previously-generated score for the New York metropolitan area airport group, determines that the score exceeds one or more threshold values (e.g., as the application's level of confidence that the text entered into the text entry field 421 corresponds to the New York metropolitan area airport group grows), and updates the airport selection list interface 422 to present data identifying each airport included in the New York metropolitan area airport group in response thereto.

In some such examples, the process 700 can include one or more additional steps in which the system generates, for each airport that is included in the particular airport group based at least in part on the one or more textual characters entered into the text entry field of the user interface, a score reflecting a level of confidence that the one or more textual characters entered into the text entry field of the user interface correspond to the respective airport. Referring once again to the example of FIG. 4, this can correspond to a computing device on which an application similar to that of application 132, as described above with reference to FIG. 1, is running generating a score for each airport included in the New York metropolitan area airport group (e.g., Teterboro airport, Westchester County airport, John F Kennedy Intl airport, Newark Liberty Intl airport). Furthermore, in at least some of the aforementioned examples, the process 700 can include one or more additional steps in which the system determines a ranking of each airport that is included in the particular airport group based at least in part on the scores generated for the airports that are included in the particular airport group. In these examples, to update the user interface to present data identifying each of the one or more selected airport groups (e.g., at step 706), the system update the user interface to present data identifying the particular airport group and data identifying each airport that is included in the particular airport group, the system updates the user interface to present data identifying the particular airport group and data identifying each airport that is included in the particular airport group in order by ranking. This can, for example, correspond to a computing device on which an application similar to that of application 132, as described above with reference to FIG. 1, is running updating an airport selection list interface in a manner similar or equivalent to that which occurs in the transition from stage A to stage B as described above with reference to FIG. 4 or in a manner similar or equivalent to that which occurs in the transition from stage B to stage C as described above with reference to FIG. 4.

In some implementations, the process 700 can include one or more additional steps in which the system generates, for each airport that is included in the one or more selected airport groups based at least in part on the one or more textual characters entered into the text entry field of the user interface, a score reflecting a level of confidence that the one or more textual characters entered into the text entry field of the user interface correspond to the respective airport. In these implementations, to generate the score for each of the one or more selected airport groups based at least in part on the one or more textual characters entered into the text entry field of the user interface, the system generates, for each of the one or more selected airport groups based at least in part on the scores generated for the airports that are included in the respective airport group, a score reflecting a level of confidence that the one or more textual characters entered into the text entry field of the user interface correspond to the respective airport group. Referring once again to the example of FIG. 4, this can correspond to a computing device on which an application similar to that of application 132, as described above with reference to FIG. 1, is running generating a score for each airport included in the New York metropolitan area airport group (e.g., Teterboro airport, Westchester County airport, John F Kennedy Intl airport, Newark Liberty Intl airport), and generating a score for the New York metropolitan area airport group based on the scores generated for the airports included in the New York metropolitan area airport group. For instance, the score that is generated for each airport group can be a sum, weighted sum, and/or product of the scores generated for the airports belonging to the respective airport group.

In some implementations, to generate the score for each of the one or more selected airport groups based at least in part on the one or more textual characters entered into the text entry field of the user interface, the system generates, for each of the plurality of airport groups based at least in part on the one or more textual characters entered into the text entry field of the user interface, a score reflecting a level of confidence that the one or more textual characters entered into the text entry field of the user interface correspond to the respective airport group. In these implementations, to select, from among the plurality of airport groups, one or more airport groups based at least in part on the one or more textual characters entered into the text entry field of the user interface (e.g., at step 704), the system selects, from among the plurality of airport groups, one or more airport groups based at least in part on the scores generated for the plurality of airport groups. For example, the system can generate a score for each of a relatively large number of airport groups, and can select one or more airport groups with scores that exceed one or more threshold values for presentation by the user interface.

In some examples, each subset of the set of airports selected for each airport group includes two or more airports identified, from among the set of airports, as being located in a same respective geographic region. For instance, such two or more airports may have been identified by a computing device or system that is similar or equivalent to the segment management system 110, as described above with reference to FIG. 1. In some such examples, the two or more airports that are included in each airport group and identified as being located in the same respective geographic region comprise two or more airports identified, from among the set of airports, as being located in a same respective metropolitan area. As described above with reference to FIGS. 2A-6, examples of such geographic regions can include Albuquerque, South Florida, New York, New Haven, and so on. In at least some of the aforementioned examples, the two or more airports that are included in each airport group are identified as being located in the same respective geographic region based on one or more portions of the historical data. For example, such one or more portions of historical data can include data similar or equivalent to one or more portions of data stored in one or both of data storage units 122 and 124, as described above with reference to FIG. 1.

In some implementations, a portion of the plurality of individual airports belong to none of the plurality of groups of airports. Referring once again to the example described above with reference to FIG. 1 in which the segment application 132 enables clients to create segments to and from over 12,000 airports around the world, the aforementioned plurality of individual airports can correspond to the 12,000 airports, the aforementioned plurality of groups of airports can correspond to the 400 airport groups (including 3,000 of the 12,000 airports), and the aforementioned portion of the plurality of individual airports that belong to none of the plurality of groups of airports correspond to the 9,000 airports (of the 12,000 airports) not selected for any of the 400 airport groups.

In some examples, wherein the user interface can include (i) a first text entry field for receiving text specifying a departure location from which a new client-initiated segment will depart, and (ii) a second text entry field for receiving text specifying a destination location at which the new client-initiated segment will arrive. For example, the first and second text entry fields can correspond to (i) one or more of departure selection elements 211, 311, 321B, and 321C as described above with reference to one or more of FIGS. 2A, 3A-3D, and (ii) one or more of destination selection elements 212, 312, 321E, and 321F as described above with reference to one or more of FIGS. 2A, 3A, and 3D-3F. Furthermore, in these examples, to receive data indicating one or more textual characters entered into the text entry field of the user interface presented by the computing device (e.g., at step 702), the system receives data indicating one or more textual characters entered into the first text entry field or the second text entry field of the user interface presented by the computing device. In some In at least some of the aforementioned examples, the process 700 can include one or more additional steps in which, before the system receives the data indicating the one or more textual characters entered into the text entry field of the user interface, the system receives data indicating a selection of the first text entry field and, in response to receiving data indicating the selection of the first text entry field, selects, from among the plurality of airport groups, an initial set of one or more airport groups based at least in part on a current location of the computing device, and updates the user interface to present data identifying each of the initial set of one or more selected airport groups. For example, this can correspond to a computing device on which an application similar to that of application 132, as described above with reference to FIG. 1, is running performing one or more operations similar or equivalent to those performed in the transition from stage A to stage B as described above with reference to FIGS. 3A and 3B.

In at least some of the aforementioned examples, the process 700 can include one or more additional steps in which, before the system receives the data indicating the one or more textual characters entered into the text entry field of the user interface, the system receives data indicating a selection of the second text entry field and, in response to receiving data indicating the selection of the second text entry field, selects, from among the plurality of airport groups, an initial set of one or more airport groups based at least in part on a departure location currently specified in the first text entry field, and updates the user interface to present data identifying each of the initial set of one or more selected airport groups. For example, this can correspond to a computing device on which an application similar to that of application 132, as described above with reference to FIG. 1, is running performing one or more operations similar or equivalent to those performed in the transition from stage D to stage E as described above with reference to FIGS. 3D and 3E.

In at least some of the aforementioned examples, to receive data indicating one or more textual characters entered into the text entry field of the user interface (e.g., at step 702), the system receives data indicating one or more textual characters entered into the first text entry field user interface. Furthermore, in these examples, to update the user interface to present data identifying each of the one or more selected airport groups, the system updates the user interface to present data identifying each of the one or more selected airport groups as one or more suggested departure locations, respectively. For example, the data identifying each of the one or more selected airport groups as one or more suggested departure locations can correspond to data similar or equivalent to that which is presented in airport selection list interfaces 322C as described above with reference to FIG. 3C.

In at least some of the aforementioned examples, to receive data indicating one or more textual characters entered into the text entry field of the user interface (e.g., at step 702), the system receives data indicating one or more textual characters entered into the second text entry field user interface presented by the computing device. Furthermore, in these examples, to update the user interface to present data identifying each of the one or more selected airport groups, the system updates the user interface to present data identifying each of the one or more selected airport groups as one or more suggested destination locations, respectively. For example, the data identifying each of the one or more selected airport groups as one or more suggested destination locations can correspond to data similar or equivalent to that which is presented in one or more of airport selection list interfaces 322F, 422, 522, and 622, as described above with reference to FIGS. 3F-6C. In some of these examples, the process 700 can include one or more additional steps in which, after the system updates the user interface to present data identifying each of the one or more selected airport groups, the system receives data indicating a selection of a particular airport group included in the one or more selected airport groups. And, based on receiving data indicating the selection of the particular airport group, the system updates the user interface to present information associated with one or more segments from a departure location specified in the first text entry field to one or more of the airports included in the particular airport group. For example, this can correspond to a computing device on which an application similar to that of application 132, as described above with reference to FIG. 1, is running presenting a set of one or more interfaces or screens responsive to a client tapping or otherwise selecting an identifier presented in an airport selection list interface. Such one or more interfaces or screens can, for example, include one or more interfaces or screens (e.g., a date selection interface, a time selection interface, an amount selection interface, an airport selection interface, a jet selection interface, a segment customization interface that enables the client to customize at least some of the attributes of the client-initiated segment from a single interface, etc.) that serve to collect additional information associated with one or more segments between the departure and destination airports or regions (e.g., a preferred date and/or time of departure, a preferred date and/or time of arrival, a preferred amount range, a preferred departure airport in a selected departure region, a preferred destination airport in a selected destination region, a preferred type of j et, etc.) from the client and/or one or more interfaces or screens (e.g., a segment customization interface that enables the client to customize at least some of the attributes of the client-initiated segment from a single interface, a map interface that shows one or more geographical maps of the departure and destination airports or regions, a checkout interface, etc.) that serve to present additional information associated with one or more segments between the departure and destination airports or regions to the client (e.g., dates and/or times of departure and arrival for one or more available segments, amounts associated with one or more available segments, departure and destination airports associated with one or more available segments, types of jets associated with one or more available segments, etc.).

In some examples, to select, from among the plurality of airport groups, one or more airport groups based at least in part on the one or more textual characters entered into the text entry field of the user interface (e.g., at step 704), the system selects, from among the plurality of airport groups and the set of airports, one or more airport groups and one or more airports based at least in part on the one or more textual characters entered into the text entry field of the user interface. Furthermore, in these examples, to update the user interface to present data identifying each of the one or more selected airport groups (e.g., at step 706), the system updates the user interface to present data identifying each of the one or more selected airport groups and each of the one or more selected airports. For instance, this can correspond to one or more of the performed in association with the example described above with reference to FIG. 3C in which the airport selection list interface 322, as presented in stage C, presents both data identifying each of one or more airport groups (e.g., data identifying the "Palo Alto," "Albertville," "Albuquerque," and "Alghero" airport groups) and data identifying each of one or more airports (e.g., data identifying "Charlottesville-Albermarle" airport in Charlottesville, VA and "Albert J Ellis" airport in Jacksonville, FL). In at least some of these examples, none of the one or more selected airports are included in the one or more selected airport groups. Both the "Charlottesville-Albermarle" airport in Charlottesville, VA and the "Albert J Ellis" airport in Jacksonville, FL can represent examples of such airports, as neither of these airports are included in the "Palo Alto," "Albertville," "Albuquerque," and/or "Alghero" airport groups.

In at least some of the aforementioned examples, the process 700 can include one or more additional steps in which the system determines a ranking of each of the one or more selected airport groups and each of the one or more selected airports based at least in part on one or more portions of the historical data. In such examples, the one or more portions of the historical data include historical data for previous client-initiated segments to and from each airport included in the one or more selected airport groups and the one or more selected airports. Furthermore, in these examples, to update the user interface to present data identifying each of the one or more selected airport groups and each of the one or more selected airports, the system updates the user interface to present data identifying each of the one or more selected airport groups and each of the one or more selected airports in order by ranking. That is, for examples in which both data identifying each of one or more airport groups and both data identifying one or more airports are presented in an airport selection list interface, such airport groups and airports can be listed in order according to rank. Indeed, for examples in which demand or popularity is a significant factor in the ranking, airport groups can tend to be ranked higher than airports, as the demand or popularity associated with a given airport group can be a collective or aggregate (e.g., additive and/or multiplicative) measure of the demand or popularity of the two or more airports included in the given airport group, while the demand or popularity associated with a given airport that is not part of any group may only depend on the air traffic experienced at the given airport.

In some implementations, wherein each of one or more of the set of airports belongs to two or more of the plurality of airport groups. For example, the Teterboro airport as depicted in FIGS. 6A-6C and described above with reference thereto, can represent one example of such an airport. In at least some of these implementations, the two or more of the plurality of airport groups to which each of one or more of the set of airports belongs include a first group of airports identified as being located in a first geographic region and a second group of airports identified as being located in a second geographic region encompassed by the first geographic region. For instance, the second geographic region can correspond to a subgroup or a subzone (e.g., neighborhood, borough, community, district, etc.) located within the first geographic region (e.g., a city, metropolitan area, etc.).

In some examples, to update the user interface to present data identifying each of the one or more selected airport groups (e.g., at step 706), the system updates the user interface to present, for each of the one or more selected airport groups, a textual identifier that is associated with the respective airport group and contains the one or more textual characters. For instance, in the example of FIG. 3C, the one or more textual characters can correspond to partial text "Al" provided in the text entry field 321 in stage C, and the one or more textual identifiers that are each associated with a respective one of the one or more selected airport groups and each contain the one or more textual characters can correspond to the "Palo Alto," "Albertville," "Albuquerque," and "Alghero" identifiers presented in the airport selection list interface 322 in stage C. In at least some of these examples, the textual identifier represents an auto-completion of the one or more textual characters. For instance, the textual identifier can represent that having been generated by or in association with an auto-complete engine that is similar or equivalent to one or more of the auto-complete engines described above with reference to FIGS. 1 and 2B. As such, the auto-completion of the one or more textual characters can represent a prediction of one or more terms (e.g., name or names of geographic regions) that the client is entering made on the basis of the text already entered by the client (e.g., one or more textual characters). In some of the aforementioned examples, each of one or more of the set of airports is associated with two or more textual identifiers. For example, the Teterboro airport as depicted in FIGS. 6A-6C and described above with reference thereto, can represent one example of such an airport.

Figure 8:
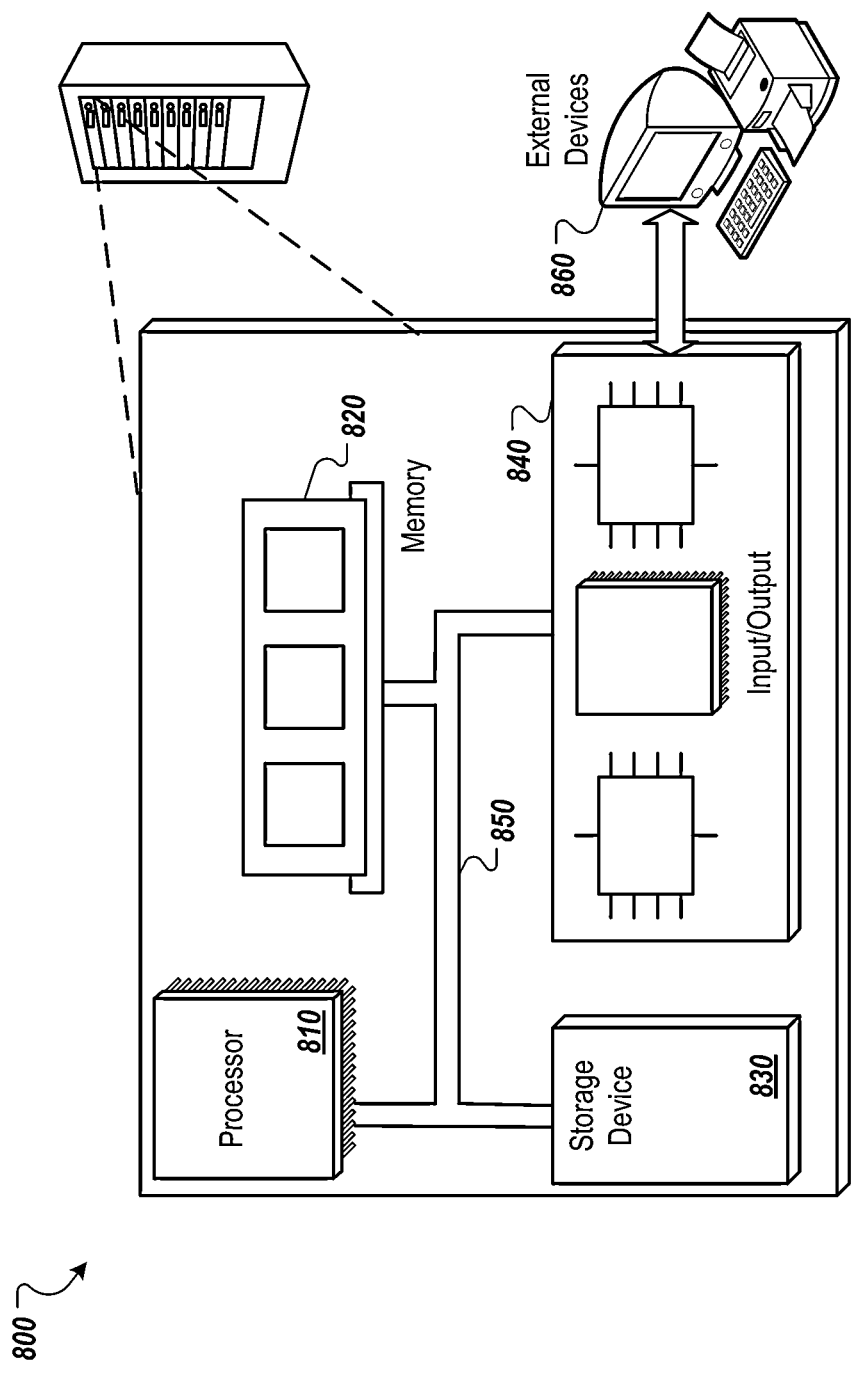
FIG. 8 is a block diagram of an example computer system.

FIG. 8 is a block diagram of an example computer system 800 that can be used to perform operations described above. The system 800 includes a processor 810, a memory 820, a storage device 830, and an input/output device 840. Each of the components 810, 820, 830, and 840 can be interconnected, for example, using a system bus 850. The processor 810 is capable of processing instructions for execution within the system 800. In some implementations, the processor 810 is a single-threaded processor. In another implementation, the processor 810 is a multi-threaded processor. The processor 810 is capable of processing instructions stored in the memory 820 or on the storage device 830.

The memory 820 stores information within the system 800. In one implementation, the memory 820 is a computer-readable medium. In some implementations, the memory 820 is a volatile memory unit. In another implementation, the memory 820 is a non-volatile memory unit.

The storage device 830 is capable of providing mass storage for the system 800. In some implementations, the storage device 830 is a computer-readable medium. In various different implementations, the storage device 830 can include, for example, a hard disk device, an optical disk device, a storage device that is shared over a network by multiple computing devices (e.g., a cloud storage device), or some other large capacity storage device.

The input/output device 840 provides input/output operations for the system 800. In some implementations, the input/output device 840 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 860, e.g., keyboard, printer and display devices. Other implementations, however, can also be used, such as mobile computing devices, mobile communication devices, set-top box television client devices, etc.

Although an example processing system has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving data indicating one or more textual characters entered into a text entry field of a user interface presented by a computing device;
   predicting, from a plurality of airport groups, one or more airport groups for one or more geographic locations to display on the user interface based on the received data indicating the one or more textual characters, the predicting comprising:
      for each airport group of the plurality of airport groups:
         grouping a subset of a set of airports into the airport group based at least in part on (i) location data indicating geographic locations of airports in the set of airports and (ii) a measure of demand for each airport in the set of airports, wherein the measure of demand for each airport is determined from historical data for previous client-initiated segments to and from each airport in the set of airports;
      identifying matched airport groups from the plurality of airport groups, each matched airport group including one or more airports with a geographic location that matches at least in part to the one or more textual characters entered into the text entry field of the user interface;
      determining, for each matched airport group, an aggregated measure of demand based on the measure of demand for each airport in the matched airport group;
      ranking the matched airport groups using the aggregated measure of demand for each matched airport group;
      selecting, from the matched airport groups, the one or more predicted airport groups based on the ranking; and
   updating the user interface to present data identifying the one or more predicted airport groups.

2. The computer-implemented method of claim 1, wherein the historical data for previous client-initiated segments comprises data specifying, for each of a plurality of geographic locations, a number of times clients selected each airport after searching for segments to or from the geographic location.

3. The computer-implemented method of claim 2, wherein the updating the user interface to present data identifying the one or more predicted airport groups comprises updating the user interface to present, for each of the one or more predicted airport groups, the one or more predicted airport groups in order based on a quantity of previous client-initiated segments to and from the airports.

4. The computer-implemented method of claim 1, wherein the historical data comprises data indicating (i) a total number of client-initiated segments to and from each of the set of airports created in a given time period, (ii) a total number of client-initiated segments to and from each of the set of airports scheduled for a given time period, (iii) a total number of client-initiated searches for each of the set of airports created in a given time period, (iv) a frequency at which client-initiated segments to and from each of the set of airports have historically been created, (v) a frequency at which client-initiated segments to and from each of the set of airports have historically occurred, (vi) a frequency at which client-initiated searches for each of the set of airports have historically occurred, or vii a combination thereof.

5. The computer-implemented method of claim 1,
   wherein the ranking of the matched airport groups is based at least in part on one or more portions of the historical data, the one or more portions of the historical data including historical data for previous client-initiated segments to and from each airport included in the matched airport groups, and
   wherein updating the user interface to present the data identifying the one or more predicted airport groups comprises: updating the user interface to present the data identifying the one or more predicted airport groups in order based on the ranking.

6. The computer-implemented method of claim 1, further comprising:
   generating, for each of the matched airport groups based at least in part on the one or more textual characters entered into the text entry field of the user interface, a score reflecting a level of confidence that the one or more textual characters entered into the text entry field of the user interface correspond to the respective matched airport group.

7. The computer-implemented method of claim 6, wherein generating the score for each of the matched airport groups based at least in part on the one or more textual characters entered into the text entry field of the user interface comprises:
   generating, for each of the matched airport groups based at least in part on (i) the one or more textual characters entered into the text entry field of the user interface and (ii) one or more portions of the historical data including historical data for previous client-initiated segments to and from the subset of the set of airports in the respective matched airport group, the score reflecting a level of confidence that the one or more textual characters entered into the text entry field of the user interface correspond to the respective matched airport group.

8. The computer-implemented method of claim 7, further comprising:

wherein the ranking of the matched airport groups is based at least in part on the score generated for each of the matched airport groups, and
wherein updating the user interface to present the data identifying the one or more predicted airport groups comprises:
updating the user interface to present the data identifying the one or more predicted airport groups based at least in part on the score generated for each of the matched airport groups.

9. The computer-implemented method of claim 6, further comprising:
determining that the score generated for a particular airport group included in the matched airport groups exceeds one or more threshold values; and
in response to determining that the score generated for the particular airport group exceeds one or more threshold values, updating the user interface to present the data identifying the particular airport group and data identifying the subset of the set of airports in the particular airport group.

10. The computer-implemented method of claim 9, further comprising:
generating, for each airport that is included in the particular airport group based at least in part on the one or more textual characters entered into the text entry field of the user interface, a score reflecting a level of confidence that the one or more textual characters entered into the text entry field of the user interface correspond to the respective airport.

11. The computer-implemented method of claim 10, wherein:
the ranking of the matched airport groups is based at least in part on the scores generated for the airports that are included in the particular airport group, and
the method further comprising updating the user interface to present data identifying the particular airport group and data identifying the subset of the set of airports in the particular airport group in order based at least in part on the scores generated for the subset of the set of airports that are included in the particular airport group.

12. The computer-implemented method of claim 6, further comprising:
generating, for each airport that is included in the matched airport groups based at least in part on the one or more textual characters entered into the text entry field of the user interface, a score reflecting a level of confidence that the one or more textual characters entered into the text entry field of the user interface correspond to the respective airport, and
wherein generating the score for each of the matched airport groups based at least in part on the one or more textual characters entered into the text entry field of the user interface comprises:
generating, for each of the matched airport groups based at least in part on the scores generated for the airports that are included in the respective matched airport group, a score reflecting a level of confidence that the one or more textual characters entered into the text entry field of the user interface correspond to the respective matched airport group.

13. The computer-implemented method of claim 6, wherein:
generating the score for each of the matched airport groups based at least in part on the one or more textual characters entered into the text entry field of the user interface comprises:
generating, for each of the plurality of airport groups based at least in part on the one or more textual characters entered into the text entry field of the user interface, a score reflecting a level of confidence that the one or more textual characters entered into the text entry field of the user interface correspond to the respective matched airport group; and
identifying, from among the plurality of airport groups, the matched airport groups based at least in part on the one or more textual characters entered into the text entry field of the user interface comprises:
identifying, from among the plurality of airport groups, the matched airport groups based at least in part on the scores generated for the plurality of airport groups.

14. The computer-implemented method of claim 1, wherein the aggregated measure of demand is determined based on one or more of (i) a total number of client-initiated segments to and from each airport created in a given time period, (ii) a total number of client-initiated segments to and from each airport scheduled for the given time period, (iii) a total number of client-initiated searches for each airport in the given time period, (iv) a frequency at which client-initiated segments to and from each airport have historically been created, (v) a frequency at which client-initiated segments to and from each airport have historically occurred, (vi) a frequency at which client-initiated searches for each airport have historically occurred, and (vii) a frequency of private jet flights departing from and arriving at the airport.

15. The computer-implemented method of claim 1, wherein determining the aggregated measure of demand further comprises:
determining a heat representation on a map for each location where an airport is located and an intensity of the heat representation corresponds to the measure of demand for the airport;
identifying one or more regions in which the intensity of the heat representation corresponding to the measure of demand for the airport exceeds a threshold value; and
in response, identifying airports in the one or more identified regions as belonging to a matched airport group.

16. The computer-implemented method of claim 1, further comprising:
determining whether to include an airport in an airport group for a geographic region based on a number of times clients select the airport when creating client-initiated private jet segments to or from the geographic region and the number of times clients select existing private jet segments to or from the airport after searching for existing private jet segments to or from the geographic region, wherein the airport is located (i) in the geographic region or (ii) outside the geographic region.

17. A system comprising:
one or more computers; and
one or more computer memory devices interoperably coupled with the one or more computers and having tangible, non-transitory, machine-readable media storing one or more instructions that, when executed by the one or more computers, perform operations comprising:
receiving data indicating one or more textual characters entered into a text entry field of a user interface presented by a computing device;

predicting, from a plurality of airport groups, one or more airport groups for one or more geographic locations to display on the user interface based on the received data indicating the one or more textual characters, the predicting comprising:

for each airport group of the plurality of airport groups:
grouping a subset of a set of airports into the airport group based at least in part on (i) location data indicating geographic locations of airports in the set of airports and (ii) a measure of demand for each airport in the set of airports, wherein the measure of demand for each airport is determined from historical data for previous client-initiated segments to and from each airport in the set of airports;

identifying matched airport groups from the plurality of airport groups, each matched airport group including one or more airports with a geographic location that matches at least in part to the one or more textual characters entered into the text entry field of the user interface;

determining, for each matched airport group, an aggregated measure of demand based on the measure of demand for each airport in the matched airport group;

ranking the matched airport groups using the aggregated measure of demand for each matched airport group;

selecting, from the matched airport groups, the one or more predicted airport groups based on the ranking; and updating the user interface to present data identifying the one or more predicted airport groups.

18. The system of claim 17, wherein the historical data for previous client-initiated segments comprises data specifying, for each of a plurality of geographic locations, a number of times clients selected each airport after searching for segments to or from the geographic location.

19. The system of claim 18, wherein the updating the user interface to present data identifying the one or more predicted airport groups comprises updating the user interface to present, for each of the one or more predicted airport groups, the one or more predicted airport groups in order based on a quantity of previous client-initiated segments to and from the airports.

20. The system of claim 17, wherein the historical data comprises data indicating (i) a total number of client-initiated segments to and from each of the set of airports created in a given time period, (ii) a total number of client-initiated segments to and from each of the set of airports scheduled for a given time period, (iii) a total number of client-initiated searches for each of the set of airports created in a given time period, (iv) a frequency at which client-initiated segments to and from each of the set of airports have historically been created, (v) a frequency at which client-initiated segments to and from each of the set of airports have historically occurred, (vi) a frequency at which client-initiated searches for each of the set of airports have historically occurred, or vii a combination thereof.

21. The system of claim 17, wherein the operations comprise:

wherein the ranking of the matched airport groups is based at least in part on one or more portions of the historical data, the one or more portions of the historical data including historical data for previous client-initiated segments to and from each airport included in the matched airport groups, and wherein updating the user interface to present the data identifying the one or more predicted airport groups comprises:
updating the user interface to present the data identifying the one or more predicted airport groups in order based on the ranking.

22. The system of claim 17, wherein the operations comprise:
generating, for each of the matched airport groups based at least in part on the one or more textual characters entered into the text entry field of the user interface, a score reflecting a level of confidence that the one or more textual characters entered into the text entry field of the user interface correspond to the respective matched airport group.

23. A non-transitory computer storage medium encoded with a computer program, the computer program comprising instructions that when executed by a data processing apparatus cause the data processing apparatus to perform operations comprising:

receiving data indicating one or more textual characters entered into a text entry field of a user interface presented by a computing device;

predicting, from a plurality of airport groups, one or more airport groups for one or more geographic locations to display on the user interface based on the received data indicating the one or more textual characters, the predicting comprising:

for each airport group of the plurality of airport groups:
grouping a subset of a set of airports into the airport group based at least in part on (i) location data indicating geographic locations of airports in the set of airports and (ii) a measure of demand for each airport in the set of airports, wherein the measure of demand for each airport is determined from historical data for previous client-initiated segments to and from each airport in the set of airports;

identifying matched airport groups from the plurality of airport groups, each matched airport group including one or more airports with a geographic location that matches at least in part to the one or more textual characters entered into the text entry field of the user interface;

determining, for each matched airport group, an aggregated measure of demand based on the measure of demand for each airport in the matched airport group;

ranking the matched airport groups using the aggregated measure of demand for each matched airport group;

selecting, from the matched airport groups, the one or more predicted airport groups based on the ranking; and updating the user interface to present data identifying the one or more predicted airport groups.

* * * * *

UNITED STATES PATENT AND TRADEMARK OFFICE
CERTIFICATE OF CORRECTION

PATENT NO. : 11,886,687 B1
APPLICATION NO. : 17/482744
DATED : January 30, 2024
INVENTOR(S) : Mikhail Kirsanov It is certified that error appears in the above-identified patent and that said Letters Patent is hereby corrected as shown below:

In the Claims

Column 40, Line 28: In Claim 4, delete "vii" and insert -- (vii) --.

Column 43, Line 61 (approx.): In Claim 20, delete "vii" and insert -- (vii) --.

Signed and Sealed this
Nineteenth Day of March, 2024

Katherine Kelly Vidal
*Director of the United States Patent and Trademark Office*